United States Patent
Fey et al.

(10) Patent No.: US 10,353,554 B2
(45) Date of Patent: *Jul. 16, 2019

(54) INTERACTIVE ANSWER BOXES FOR USER SEARCH QUERIES

(71) Applicant: Google LLC, Mountain View, CA (US)

(72) Inventors: Nicholas G. Fey, Mountain View, CA (US); Michael van Ouwerkerk, London (GB); Yury Pinsky, Mountain View, CA (US)

(73) Assignee: Google LLC, Mountain View, CA (US)

( * ) Notice: Subject to any disclaimer, the term of this patent is extended or adjusted under 35 U.S.C. 154(b) by 83 days.

This patent is subject to a terminal disclaimer.

(21) Appl. No.: 14/971,374

(22) Filed: Dec. 16, 2015

(65) Prior Publication Data

US 2016/0098164 A1    Apr. 7, 2016

Related U.S. Application Data

(63) Continuation of application No. 13/707,944, filed on Dec. 7, 2012, now Pat. No. 9,274,683.

(60) Provisional application No. 61/581,874, filed on Dec. 30, 2011.

(51) Int. Cl.

| | | |
|---|---|---|
| *G06F 3/0483* | (2013.01) | |
| *G06F 3/0484* | (2013.01) | |
| *G06F 16/951* | (2019.01) | |
| *G06F 16/957* | (2019.01) | |
| *G06F 16/9535* | (2019.01) | |

(52) U.S. Cl.
CPC .......... *G06F 3/0484* (2013.01); *G06F 3/0483* (2013.01); *G06F 16/951* (2019.01); *G06F 16/9535* (2019.01); *G06F 16/9577* (2019.01)

(58) Field of Classification Search
CPC ............ G06F 3/0483; G06F 17/30864; G06F 17/30696; G06F 3/0484; G06F 16/951; G06F 16/9577; G06F 16/9535
See application file for complete search history.

(56) References Cited

U.S. PATENT DOCUMENTS

| | | | |
|---|---|---|---|
| 7,487,146 B2 | 2/2009 | Friedman | |
| 7,783,622 B1 | 8/2010 | Vandermolen et al. | |
| 8,032,513 B2 | 4/2011 | Newbold et al. | |
| 8,095,582 B2 | 1/2012 | Cramer | |
| 8,346,815 B2 | 1/2013 | Dasher | |
| 2003/0120654 A1* | 6/2003 | Edlund | ............ G06F 17/30864 |

(Continued)

*Primary Examiner* — Aaron Lowenberger
(74) *Attorney, Agent, or Firm* — Fish & Richardson P.C.

(57) ABSTRACT

Methods, systems, and apparatus, including computer programs encoded on a computer storage medium, for presenting data are disclosed. In one aspect, a method includes presenting, by a user device, an answer box as a search result in a search result location of a search results page. The answer box can include first content responsive to a query that submitted with a first resource request over a network. The user device determines that a user interaction with the answer box has occurred. In response to determining that the user interaction has occurred, the user device can presents second content in the answer box. The second content is selected from available content that has not been presented prior to the user interaction. The second content is presented independent of submission of a second resource request over the network subsequent to submission of the first resource request.

20 Claims, 14 Drawing Sheets

(56) References Cited

U.S. PATENT DOCUMENTS

| | | |
|---|---|---|
| 2003/0177445 A1 | 9/2003 | Sunata |
| 2004/0117735 A1 | 6/2004 | Breen |
| 2007/0050339 A1 | 3/2007 | Kasperski et al. |
| 2007/0192293 A1* | 8/2007 | Swen ................ G06F 17/30696 |
| 2007/0239675 A1* | 10/2007 | Ragno ............... G06F 17/30038 |
| 2007/0276803 A1* | 11/2007 | Shakib .............. G06F 17/30864 |
| 2008/0082512 A1* | 4/2008 | Hogan .............. G06F 17/30864 |
| 2008/0228720 A1 | 9/2008 | Mukherjee et al. |
| 2008/0270931 A1 | 10/2008 | Bamford |
| 2009/0055360 A1 | 2/2009 | Morris et al. |
| 2009/0094211 A1 | 4/2009 | Marvit et al. |
| 2010/0131495 A1* | 5/2010 | Murdock .......... G06F 17/30864 |
| | | 707/722 |
| 2010/0281417 A1 | 11/2010 | Yolleck et al. |
| 2010/0287175 A1* | 11/2010 | Beaudreau ........ G06F 17/30657 |
| | | 707/759 |
| 2011/0087985 A1 | 4/2011 | Buchanan et al. |
| 2012/0005198 A1 | 1/2012 | Pontier |

\* cited by examiner

INTERACTIVE ANSWER BOXES FOR USER SEARCH QUERIES

CROSS-REFERENCE TO RELATED APPLICATIONS

This application is a continuation application of, and claims priority to, U.S. patent application Ser. No. 13/707,944, titled "Interactive Answer Boxes For User Search Queries," filed on Dec. 7, 2012, which application claims the benefit under 35 U.S.C. § 119(e) of U.S. Patent Application No. 61/581,874, entitled "Interactive Answer Boxes For User Search Queries," filed Dec. 30, 2011. The disclosure of each of the foregoing applications is incorporated herein by reference.

BACKGROUND

This specification relates to data presentation.

The Internet provides access to a wide variety of resources, such as image files, audio files, video files, and web pages. A search system can identify resources in response to queries submitted by users and provide information about the resources in a manner that is useful to the users.

Users of search systems are often searching for an answer to a specific question, rather than a listing of resources. For example, users may want to know what the weather is in a particular location, a current quote for a stock, what the definition of a particular word is, how to convert between two time zones, or the product of multiplying two numbers.

An answer box is a formatted presentation of content that is relevant to a query. For example, if the user's query refers to weather in a particular location, the answer box can include a weather forecast for that particular location. An answer box typically has a category that is one of a predefined group of categories, and is formatted according to a template specific to its category.

SUMMARY

In general, one innovative aspect of the subject matter described in this specification can be embodied in methods that include the actions of presenting, by a user device, an answer box as a search result in a search result location of a search results page, the search result location having a perimeter defining the search result location, the answer box including first content responsive to a query that was submitted with a first resource request over a network; determining, by the user device, that a user interaction with the answer box has occurred; and in response to determining that the user interaction has occurred, presenting, by the user device, second content in the answer box and within the perimeter of the search result location, the second content being selected from available content based on the user interaction, the available content being content that was not presented prior to the user interaction, the presentation of the second content being independent of submission of a second resource request over the network subsequent to submission of the first resource request. Other embodiments of this aspect include corresponding systems, apparatus, and computer programs, configured to perform the actions of the methods, encoded on computer storage devices.

These and other embodiments can each optionally include one or more of the following features. Presenting the additional content in the answer box can include presenting the second content without submitting the second resource request over the network; and maintaining presentation of the search results page.

The user device can be a mobile computing device and the network can be a mobile communications network. Methods can further include receiving the first content and the second content in a same data transfer over the mobile communications network, the data transfer being initiated in response to the first resource request.

Presenting the second content in the answer box can include presenting the second content in place of the first content. Methods can further include identifying a user identifier for the user device that submitted the query; and identifying the first content and the second content based on a user profile for the user identifier.

Methods can further include determining that the answer box is presented on a mobile device including a display having a display area; and sizing the answer box in a manner that causes the answer box to be presented over at least a threshold portion of the display area.

Methods can further include determining a confidence measure for the answer box, the confidence measure specifying a value indicative of a likelihood that the available content for the answer box is responsive to the query; determining that the confidence measure exceeds a confidence threshold; and in response to determining that the confidence measure exceeds the threshold, sizing the answer box in a manner that causes the answer box to be presented over at least a threshold portion of the display area in which the search results page is presented.

The first content can be presented by a first display card and the second content can be displayed by a second card, wherein the answer box includes a presentation control user interface element that enables a user to select between cards, and wherein the answer box includes a number of cards, the number of cards being determined based on a user identifier for the query.

Determining that a the user interaction has occurred can include determining that a user swipe has occurred, the determination that the user swipe has occurred being based, at least in part, on detection of a pointer at multiple locations along a path that extends from a first display location within the answer box at least to a second display location within the answer box, the second display location being at least a threshold distance from the first display location.

The answer box can further include a presentation control user interface that enables a user to control presentation of content within the answer box. The first content can include weather information for a particular location and the second content can include additional weather information for the particular location.

The first content can include a graph depicting pricing information for a financial security for a particular time period. The answer box can include a presentation control user interface element that enables a user to select a time period for the pricing information. Determining that a user interaction with the answer box occurred can include determining that an updated time period has been selected using the presentation control user interface. The second content can include pricing information for the financial security for the updated time period.

The first content can be a first information card. Presenting second content in the answer box can include identifying, based on the user interaction, a second information card to be presented in the answer box; and replacing the first information card with the second information card.

Particular embodiments of the subject matter described in this specification can be implemented so as to realize one or more of the following advantages. Users can interact with an answer box presented on a search results page to access additional content relevant to a query without leaving the search results page. The additional content can be, for example, content requested by the user using a presentation control user interface element. Initial content and additional content can be transferred to a user device in a single data transfer for presentation within the answer box. The initial content can be displayed when the search results page is initially presented and the additional content can be presented in response to a user interaction. Because the additional content has already been transferred to the user device with the search results page, the additional content can be presented quickly and without initiating a resource request. The answer box can provide functionality similar to that provided by a native application of another web page without navigating away from the search results page. Content presented by the answer box can be, for example, based on a user identifier to provide personalized information in the answer box. Because the content can be based on a user identifier, the content presented in the answer box may be more relevant and formatted in a more useful way for a user associated with the user identifier.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
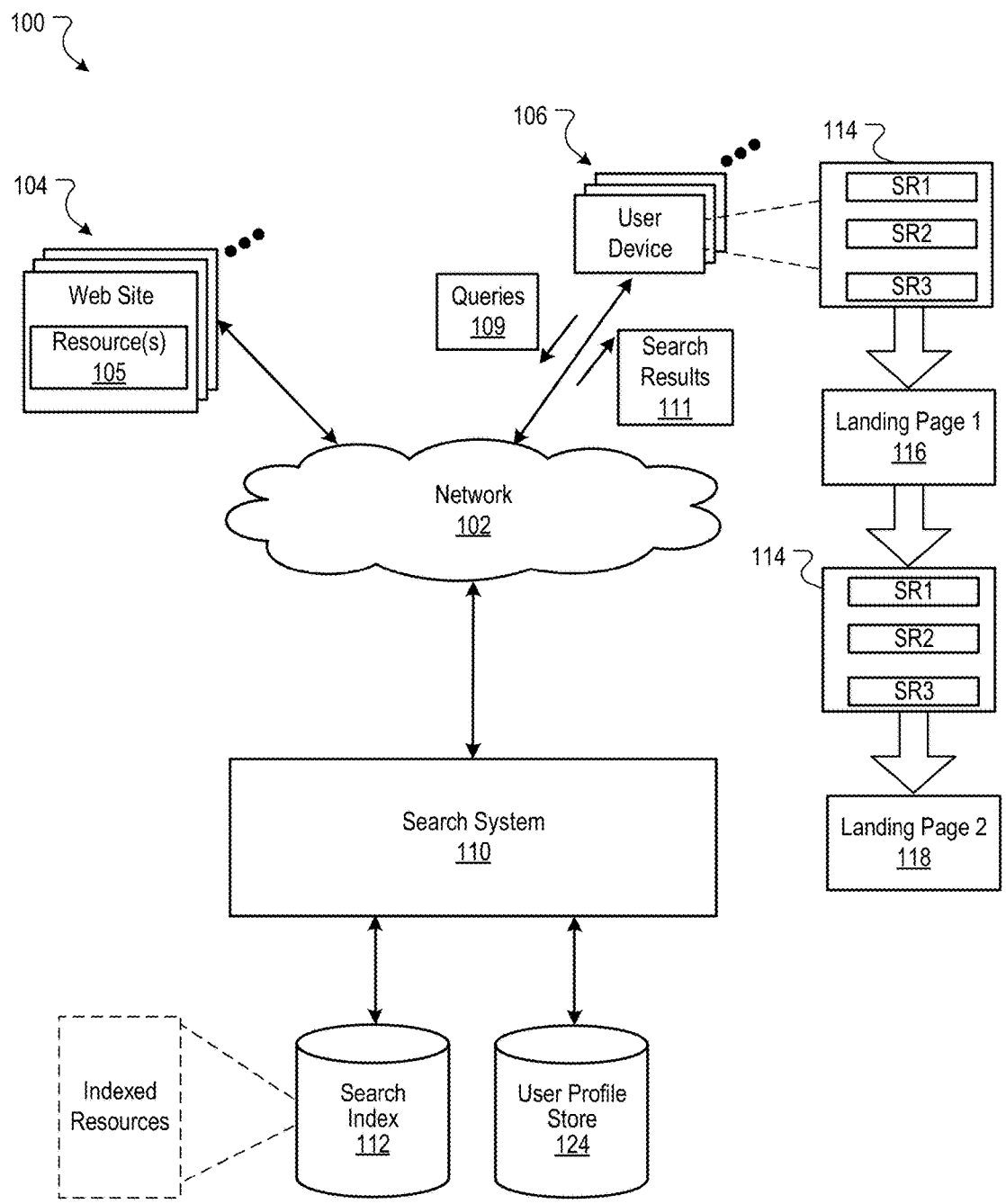
FIG. 1 is a block diagram of an example environment in which a search system provides search services.

FIG. 1 is a block diagram of an example environment 100 in which a search system 110 provides search services. The example environment 100 includes a network 102, e.g., a local area network (LAN), wide area network (WAN), the Internet, or a combination of them, connects web sites 104, user devices 106, and the search system 110. The network 102 can be accessed over a wired and/or a wireless communications link. For example, mobile computing devices, such as smartphones can utilize a cellular network to access the network. The environment 100 may include millions of web sites 104 and user devices 106.

A web site 104 is one or more resources 105 associated with a domain name and hosted by one or more servers. An example web site is a collection of web pages formatted in hypertext markup language (HTML) that can contain text, images, multimedia content, and programming elements, e.g., scripts. Each web site 104 is maintained by a publisher, e.g., an entity that manages and/or owns the web site.

A resource 105 is data provided over the network 102 and that is associated with a resource address. Resources 105 that can be provided by a web site 104 include HTML pages, word processing documents, and portable document format (PDF) documents, images, video, and feed sources, to name just a few. The resources 105 can include content, e.g., words, phrases, images and sounds and may include embedded information, e.g., meta information and hyperlinks, and/or embedded instructions, e.g., scripts.

A user device 106 is an electronic device that is capable of requesting and receiving resources 105 over the network 102. Example user devices 106 include personal computers, mobile computing devices, e.g., smartphones and/or tablet computing devices, that can send and receive data over the network 102. As used throughout this document, the term mobile computing device ("mobile device") refers to a user device that is configured to communicate over a mobile communications network. A smartphone, i.e., a phone that is enabled to communicate over the Internet, is an example of a mobile device. A user device 106 typically includes a user application, e.g., a web browser, to facilitate the sending and receiving of data over the network 102.

To facilitate searching of resources 105, the search system 110 identifies the resources 105 by crawling and indexing the resources 105 provided on web sites 104. Data about the resources 105 can be indexed based on the resource to which the data corresponds. The indexed and, optionally, cached copies of the resources 105 are stored in a search index 112.

The user devices 106 submit search queries 109 to the search system 110. In response, the search system 110 accesses the search index 112 to identify resources 105 that are relevant to, e.g., have at least a minimum specified relevance score for, the search query 109. The search system 110 identifies the resources 105, generates search results 111 that identify the resources 105, and returns the search results 111 to the user devices 106. A search result 111 is data generated by the search system 110 that identifies a resource 105 that is responsive to a particular search query, and includes a link to the resource 105. An example search result 111 can include a web page title, a snippet of text or a portion of an image extracted from the web page, and the URL of the web page.

The search results 111 (e.g., SR1, SR2, SR3) are presented in a search results page 114 that is displayed at the user device 106. User interaction with a search result (e.g., SR1) causes the user device 106 to request a landing page (e.g., Landing Page 1 (116)) referenced by the search result. In some implementations, the user device 106 submits a hypertext transfer protocol ("HTTP") request for a resource that is located at a uniform resource locator ("URL") specified by the search result with which the user interaction occurred.

For example, user interaction with the search result SR1 can cause the user device 106 to request Landing Page 1 (116) that is referenced by the search result SR1. In response to the request, data that cause presentation of Landing Page 1 (116) are received by the user device 106 and used to present Landing Page 1 (116) at the user device 106. In this example, the presentation of Landing Page 1 (116) may cause the search results page 114 to no longer be presented. For example, a browser that was presenting search results page 114 may present Landing Page 1 (116) in place of the results page 114.

To view additional landing pages for additional search results, a user can again request presentation of search results page 114, for example, by interacting with a "back" element that is provided in their browser. Interaction with the "back" element will again cause presentation of the search results page 114, and the user can then interact with another search result, such as SR2, to request presentation of landing page 2 (118) that is referenced by the other search result. Similar interaction with the "back" element and additional search results can be iteratively performed to continue to view landing pages for additional search results.

The search system 110 can also generate answer boxes and provide the answer boxes in response to a search query 109. In general, an answer box is a formatted presentation of content that is relevant to a query 109. An answer box can include text, images, video, audio, forms, documents, and other types of data that can exist in a computing environment.

An answer box may be provided as a search result, for example, with other search results, in response to informational queries. An informational query is a query directed to specific information. For example, a query for "weather in Atlanta" or "hotels in New York City" may be classified as informational queries. In some implementations, the search system 110 can determine whether a particular query is an informational query and provide an answer box as a search result in response to determining that the query is an informational query. The search system 110 may also provide answer boxes for other types of queries.

An answer box can be formatted based on a category for the answer box. Example categories for answer boxes include weather, financial security information, audio, video, people, places, landmarks, animals, and show times, e.g., movie listings, to name a few. Each of a predefined group of categories can include one or more templates specific to the category. The templates define the type of content in the answer box and the formatting of the content. For example, a template for a weather information answer box may include a predefined area for presenting an image indicative of the current weather in a particular location and a predefined area for text that specifies the current weather and weather forecasts for future time periods. In some implementations, an answer box can also be formatted based on information that is associated with a user identifier for a user device to which the answer box will be provided, as discussed below. When generating an answer box, the search system 110 can select a template, identify content for populating the template, and provide the template and identified content to the user device 106 for presentation.

An answer box can include content obtained from one or more web sites 104 or resources 105. For example, an answer box may include weather information obtained from a web site of a weather forecaster or from web sites of multiple weather forecasters. The search system 110 can identify content from the one or more web sites and specify the content for populating an answer box.

Answer boxes may also include web links to other web sites. For example, the search system 110 may provide a link to each web site from which content presented by the answer box was obtained. This enables users to easily navigate to those web sites to obtain additional information by interacting with the links.

Answer boxes can be presented along with search results 111, or independent of search results 111. In some implementations, one or more answer boxes are presented at the top of a search results page 114 and above other search results 111 identified as being responsive to a search query 109. In some implementations, a search results page 114 may include one or more answer boxes only, without having other search results 111. For example, a single answer box may be sized in a manner to fill a search results page 114 or display of a user device 106 if the search system 110 determines with at least a threshold level of confidence that the answer box provides the content for which the user is looking.

The search system 110 can generate and provide interactive answer boxes that enable users to control content presented by the answer box and/or to request additional content for presentation by the answer box. Interactive answer boxes are answer boxes that enable users to view additional content associated with the answer box without navigating away from the search results page 114. For example, the additional content requested by the user can be presented within the answer box on the search results page 114 in response to user interaction with the answer box. As discussed below, the additional content may be downloaded to the user device in advance of a request to reduce latency in content retrieval.

In some implementations, the answer boxes are configured to visually appear as native applications that are typically hosted on a web site referenced by a search result 111. For example, financial web sites often enable users to interact with graphs that depict historical stock prices to change the manner in which information is presented in the graphs. To emulate this user experience, an interactive answer box that is presenting financial information can include a graph that behaves similar to a native chart of a web site. For example, historical pricing information can be transmitted to the user device in response to a search query for the financial information. The user device can use the received pricing information to update the chart in response to a user interacting with the chart in the answer box.

An answer box may include one or more presentation control user interface elements that enable a user to control or request content. Example presentation control user interface elements include sliders, search boxes, scroll bars, forms, and dials to name just a few. In some implementations, users can also control or request content by "swiping" the answer box or a portion of the answer box. For example, the user device 106 having a touch screen and presenting the answer box may detect a "swipe" of a user's finger or another pointer within the answer box and present additional content in response to detecting the swipe. A user swipe can be determined to have occurred in response to detecting a pointer at multiple locations along a path that extends between two display points within the answer box, where at least two of the multiple locations at which the pointer has been detected are at least a threshold distance apart.

The search system 110 can identify initial content and additional content for an answer box based, at least in part, on a received query 109. For example, the search system 110 may identify a wide variety of content that is relevant to a query 109. The search system 110 can select, from the identified content, initial content that is to be presented in the answer box when the search results page 114 is initially presented. The search system 110 can also select additional content that can be requested by the user, for example by interacting with the answer box. For example, the answer box may include a scroll bar that enables the user to scroll between initial content and additional content.

The search system 110 may organize content for an answer box into multiple cards. Each card may include a template for presenting a particular type of content. The template for each card can be selected, for example, based on the particular type of content to be presented in the card. For example, a template for a summary card for a particular subject, e.g., a card that includes various types of content for the particular subject, may include an area for presenting an image that has been identified as relevant to the particular subject and an area for presenting textual content that has been identified as relevant to the particular subject and/or the image.

Similarly, an images card for a particular subject, e.g., a card that includes two or more images that have been identified as relevant to the particular subject, may include multiple different areas in which multiple different images can be presented. Other templates such as a list template that lists discrete items of information about the particular subject can also be used to create the cards that are available for presentation.

The template for each card can be formatted in a manner that facilitates presentation of the card in an answer box that is presented with a search results page 114. For example, the template for each card can have dimensions that are the same as or proportionally based on the size of the answer box in which the cards will be presented.

The cards can be cycled in and out of an answer box, for example in response to a user interaction with the answer box, to enable the user to access additional content. When a new card is cycled into the answer box, the new card and its content can replace the previously displayed card and its content.

A user can navigate between cards of an answer box to access additional content for the answer box by interacting with the answer box. For example, an answer box may include a link for each card that, when selected, causes the user device presenting the answer box to present the selected card. Or, a user may navigate between cards by swiping the answer box in a particular direction. For example, in response to detecting a swipe from left to right within the answer box, the user device may present a subsequent card in the answer box. If the user device detects a swipe from right to left within the answer box, the user device may present a previous card in the answer box.

The particular cards that are provided for presentation in an answer box may be selected, in part, based on a category for the query 109. For example, cards that are provided for presentation in response to a query that has been classified as a weather query may include an initial card that presents current weather, e.g., weather conditions at the time of the query, in a particular location, e.g., a location specified in the query or other location data received with the query, and additional cards for presenting a five day forecast, an hourly forecast, and past weather information. Similarly, cards that are provided for presentation in response to a query that has been classified as a finance query may include an initial card that presents a chart that illustrates financial information, such as a stock performance chart, and/or other information about a financial security that is specified in the query.

The category for a query 109 can be determined, for example, based on a query-category mapping that specifies one or more categories to which each query in a set of queries has been categorized. For example, the query category mapping may specify that a query that includes the phrase "current temperature" maps to the category of weather queries. Similarly, the query mapping may specify that a query that matches a stock symbol for a stock that is traded on a stock exchange maps to the category of finance queries. A query-category mapping can be created, for example, using query similarity measures, e.g., cosine similarity measures, clustering techniques that create clusters of queries on a per-category basis, or other query categorization techniques, for example, hierarchical term mappings that specify hierarchical relationships between phrases.

As described above, the search system 110 provides an initial card for presenting the initial content on the search results page 114 when the search results page 114 is initially presented on the user device 106. This initial content may be general information that attempts to answer the user's query. Additional cards may also be provided for presenting additional content.

The additional content may be broader than the initial content or more specific than the initial content. For example, an initial card for a query directed to a particular stock may include a quote for the stock, recent pricing information for the stock, and news regarding the company that issued the stock. A more specific card may include additional information regarding the stock, such as average volume for the stock and a market cap for the stock. A card having broad content may include information regarding one or more stock market indices.

The additional content may provide information that the user is likely to request later. For example, the additional content for a query directed to movie times at a particular theater may include reviews for each movie showing at the theater. If the user finds a movie of interest at the theater, the user may want to view reviews of the movie.

The additional content can be selected, for example, based on an analysis of query logs to identity types of information that users often request following a particular query. For example, if at least a threshold number of users that submitted a query for times at which a particular movie is playing subsequently submitted queries requesting reviews for the particular movie, then the additional content for the movie time query may include the review information.

The user can navigate between cards by interacting with the answer box. In some implementations, the answer box presents a link to each card of the answer box. In some implementations, the answer box include forward and back links that enable the user to navigate between cards. In some implementations, the user device 106 is configured to navigate between cards in response to detecting a user "swipe." When a card is selected, the content of the selected card can replace the content of the previous card within the answer box.

In some implementations, the search system 110 transmits both the initial content and the additional content for an answer box at or close to the same time. For example, the user device 106 may establish a temporary communication channel over a mobile communications network, e.g., a cellular network, and during this temporary connection, the search system 110 can transmit both the initial content and the additional content to the user device 106 along with other search results 111. Regardless of how the content is transmitted to the user device 106, the additional content can be provided to the user device 106 prior to the user requesting the additional content. This enables the user device 106 to provide the additional content quickly and without initiating a request for the additional content from the search system 110 or another web resource.

The search system 110 may specify the size of an answer box based on one or more factors. For example, an answer box may be sized similar to other search results 111 on a search results page 114, larger or smaller than other search results 111, or to fill the display area of a search results page 114 or of the user device 106 at which the answer box is presented.

In some implementations, the search system 110 determines how to size an answer box based on a confidence measure. The confidence measure may be a value indicative of a likelihood that the content for the answer box is responsive to the query 109. In some implementations, the confidence measure is based on scores related to the content for the answer box, such as information retrieval ("IR") scores. For example, the confidence measure for a video answer box may be based on IR scores for each video identified for the answer box. The confidence measure may be based on a sum, average, weighted average, or other combination of individual scores for the answer box content. For example, an initial video for a video answer box may be weighted more heavily than additional videos in a weighted average calculation.

In some implementations, the confidence measure can be based on the amount of content and/or the number of cards identified for the answer box. For example, if a large amount of content is identified for the answer box, then it may be more likely that the content, or a portion thereof, is responsive to the query 109. For purposes of illustration, assume that one card is available for presentation in response to queries that have been identified as requesting information about "Unknown Actor", while five cards, e.g., one card for each of five different categories of information, are available for presentation in response to queries that have been identified as requesting information about "Famous Singer". In this example, the confidence measure for "Famous Singer" may be higher than the confidence measure for "Unknown Actor".

If the confidence measure exceeds a threshold, the search system 110 may specify that the answer box fill or substantially fill the search results page 114. By filling the search results page 114 with the answer box, the search system 110 can provide the content deemed most relevant to the search query 109 in a format that is more easily viewed by the user. If the confidence measure does not exceed the threshold, the search system 110 may specify that the answer box be displayed at a particular location of a search results page 114 and/or with other search results 111 for the query 109. For example, the answer box may be presented at the top, or bottom, of the search results page 114 above, or below, the other search results 111 presented in the page or in a search result location between other search results 111, e.g., in the middle of the page.

The search system 110 may determine how to size an answer box based on the user device 106 at which the answer box will be presented. For example, the search system 110 may specify that answer boxes for mobile devices, such as smart phones, be sized to fill or substantially fill the search results page 114. As the display of mobile devices are typically small compared to non-mobile computing systems, sizing an answer box to fill all or most of the small display makes it easier for a user to view and interact with content presented by the answer box.

The search system 110 may also customize answer boxes for particular users, based, for example, on user identifiers that are associated with the users. For example, a user may have an account with the search system 110 that enables the user to specify user preferences and receive customized information. When the user is logged into their account, the search system 110 can identify the user identifier for the user and customize answer boxes based on the information that is associated with, e.g., indexed according to and/or stored with a reference to, the user identifier.

An example of user identifier customizations includes customizing the cards that are available for presentation in an answer box that is provided in response to a query that is associated with the user identifier. The type of cards and number of cards included with an answer box may be determined based on user identifier. For example, some users may prefer few cards having general content while other users may prefer many cards, with some of the cards having very specific information.

In some implementations, for users that have created an account, the search system 110 can log interaction information for user identifiers in a user profile data store 124 and use the logged information to determine the type of content and number of cards to provide for the user identifiers. The logged interaction information can include, for example, information identifying the cards that a user has previously selected and other interactions with answer boxes.

In some implementations, the users are given the option to specify the number of cards, the type of cards, and/or the type of content desired. A user may be given the option to select from available cards for one or more categories of cards. For example, a user may select, for weather answer boxes, a card for viewing general weather information in the location of the user device, or another user specified location, and a card for viewing a three day forecast for that area.

In some implementations, answer boxes are implemented using a markup language for a web page, such as a Hypertext Markup Language (HTML). For example, answer boxes may be implemented using HTML5. Some markup languages, such as HTML5 allow for local storage of content, such as for local storage of the additional content for an answer box. This additional content can be hidden from view until requested by the user.

Figure 2A:
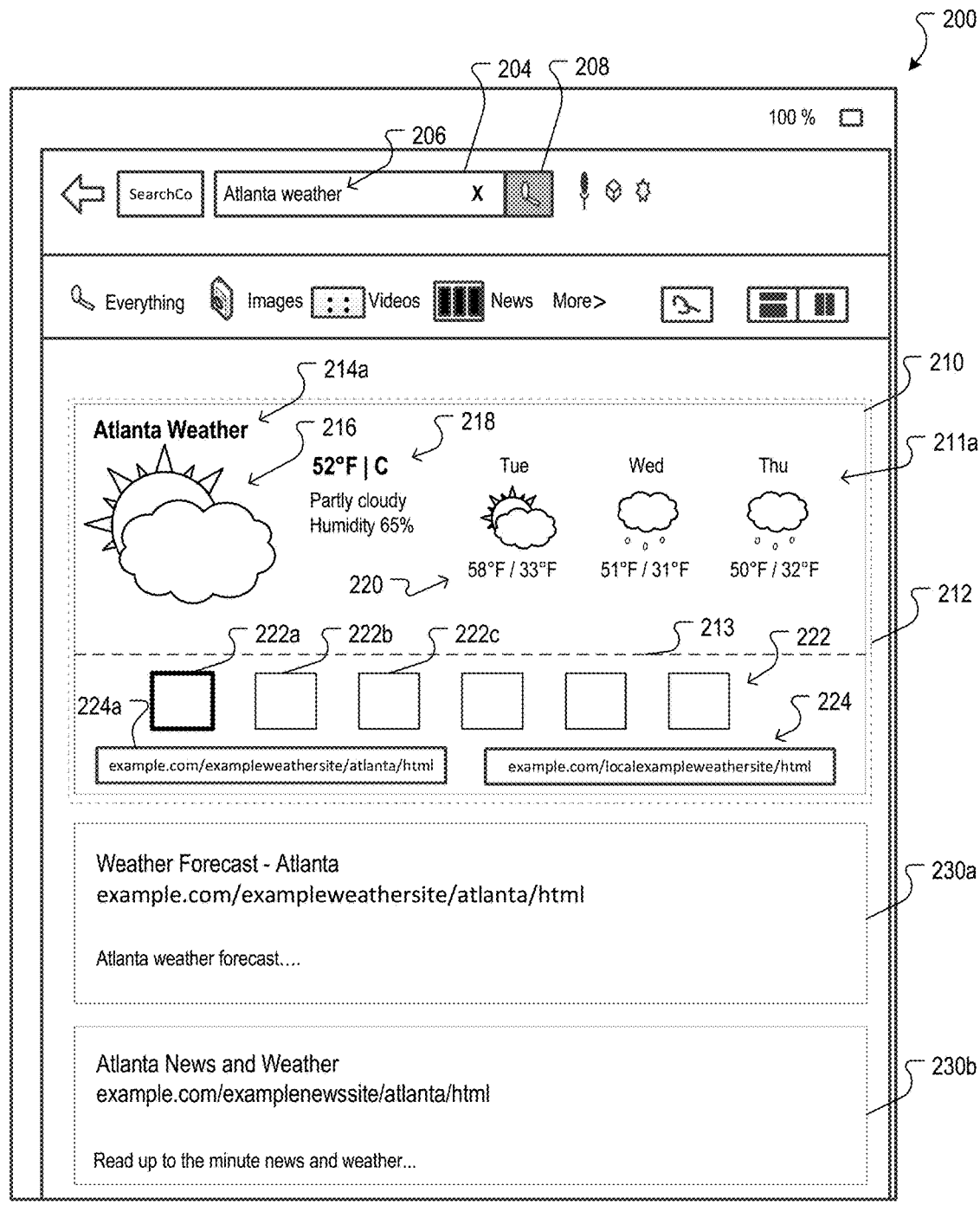
FIGS. 2A-2D are screen shots of an example search interface in which an interactive answer box is presented.

FIG. 2A is a screenshot of an example search interface 200 in which an interactive answer box 210 is presented. The search interface 200 can be presented at a user device, such as a mobile phone or tablet computing device. The search interface 200 includes a query entry field 204 in which a user can enter a search query 206. The search interface 200 also includes a search initiation element 208 with which the search query 206 can be submitted to the search system 110. For example, in response to user interaction with the search initiation element 208, the user device can submit a search query 206 to the search system 110 as described above with reference to FIG. 1.

The search interface 200 also includes an answer box 210 and search results 230a and 230b. The answer box 210 and the search results 230a and 230b are search results that have been received from a search system, such as the search system 110, in response to the submission of the search query 206. Although one answer box 210 and two search results 230a and 230b are illustrated in the example search interface 200, other numbers of answer boxes and search results may be presented by a search interface 200.

The answer box 210 and the search results 230a and 230b are each presented in a separate search result location so that each search result is independently identifiable from other search results. A search result location is a portion of a search results page in which a particular search result is presented. For example, the answer box 210 is presented in a search result location that is bounded by the dashed line 212. The dashed line 212 is a conceptual representation of the search result location in which the answer box 210 is presented and has a perimeter that bounds the answer box 210. In some implementations, content presented by the answer box 210 does not breach the borders of its search result location.

The perimeter of particular search result locations can be presented on a search results page, e.g., through shading or highlighting of the area within the perimeter, or the perimeter of the particular search result location may be implemented in a manner such that the perimeter is not presented on the search interface 200 or on a search results page 114. Note that the area enclosed by the perimeter of a search result location can be the same as, or larger than, the area of the search result that is presented in the search result location.

The example answer box 210 includes a card 211a having weather content responsive to a search for "Atlanta weather." In particular, the card 211a includes a title 214a, an image 216 indicative of current weather conditions, textual content 218 describing the current weather conditions, and future forecast elements 220 that present several days of weather forecasts. The answer box 210 also includes card links 222 and web links 224.

Each web link 224 includes a link to a resource, such as a web page. For example, the web link 224a includes a link to "example.com/exampleweathersite/atlanta/html." If the user device detects a selection of a web link 224, the user device can request the resource to which the selected web link 224 is linked. For example, in response to the link 224a being selected, the user device 106 may request the web page hosted at "example.com/exampleweathersite/atlanta/html" and present the web page when it is received. Thus, selection of a web link 224 can cause the user device to present the web page in place of the search results page.

The card links 222 enable a user to navigate between available cards for the answer box 210. For example, several cards that each have content responsive to the search query 206 may be transmitted to the user device. The user can select a card, for example by clicking or tapping on a card link 222, and content for the selected card can be presented in the answer box 210. A card link 222 for a card that is currently being presented by the answer box 210 can be highlighted to indicate to the user which card is being presented. For example, the card link 222a for the card 211a is highlighted in FIG. 2A to indicate that the card 211a referenced by the card link 222a is currently being presented. If the card link 222b is selected, the card referenced by the card link 222b may be presented in place of the card 211a and the card link 222b may be highlighted.

As discussed above, content for an answer box may be provided to a user device 106 prior to a request for the content. For example, each card may be provided to the user device 106 in response to receiving the search query 206. One of the cards may include initial content, and each other card may include additional content that the user can request. For example, the card 211a may include initial content, such as the image 216, the textual content 218, and the future forecast elements 220. This content provides general content that answers the user's query for "Atlanta weather."

Figure 2B:
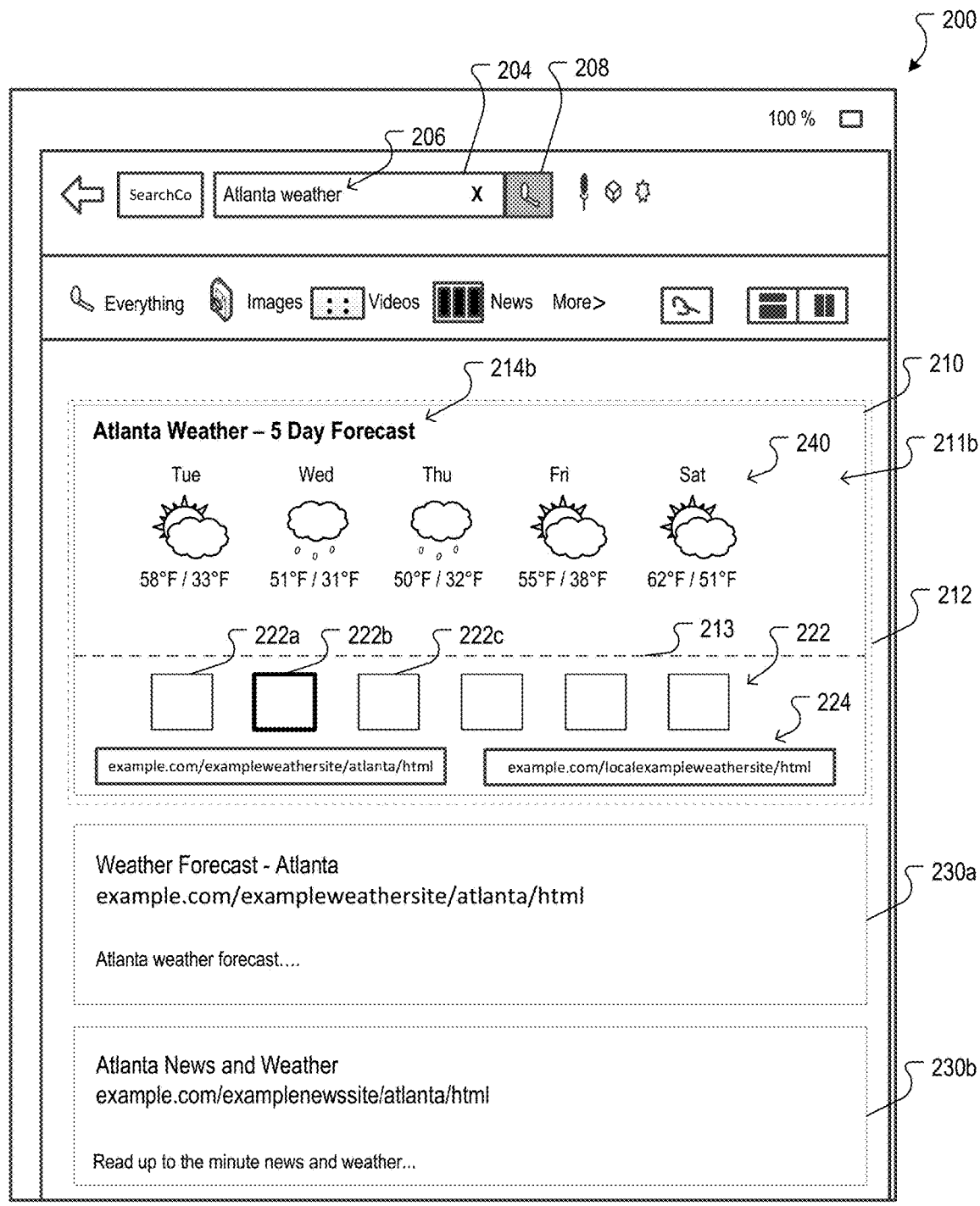

Other cards may provide different types of content relevant to the search query 206. For example, with reference to FIG. 2B, the card 211b includes a five day weather forecast for Atlanta. In particular, the card 211b includes a title 214b for the card 211b and future forecast elements 240 for the next five days. This card 211b may be presented, for example, in response to receiving a selection of the card link 222b while another card, such as the card 211a presented in FIG. 2A, is presented. Thus, selection of the card link 222b while the card 211a is presented can cause the card 211b to replace the card 211a in the answer box 210.

The answer box 210 can include a card region for presenting the cards 211. For example, the card region may be the region of the answer box 210 above the dashed line 213. Content for each card may be presented in the card region of the answer box 210, which is above the dashed line 213, while the web links 224 and the card links 222 are presented in a link region that is below the dashed line 213. When another card is selected, content for the selected card can replace the previous card in the card region above the dashed line 213, while the card links 222 can remain presented in the link region below the dashed line 213. The dashed line 213 is for reference only and may or may not be depicted at a user device 106.

Figure 2C:
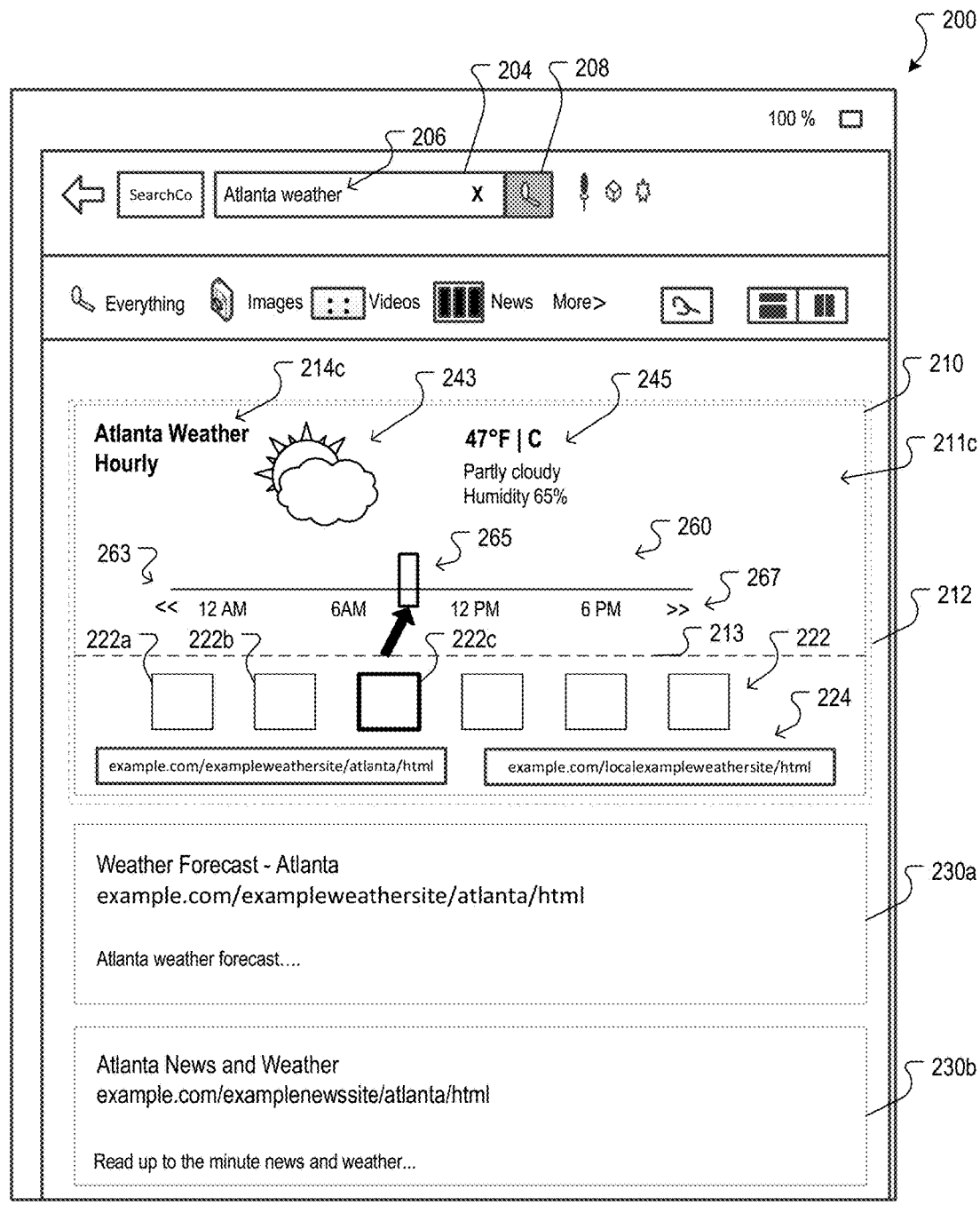
Figure 2D:
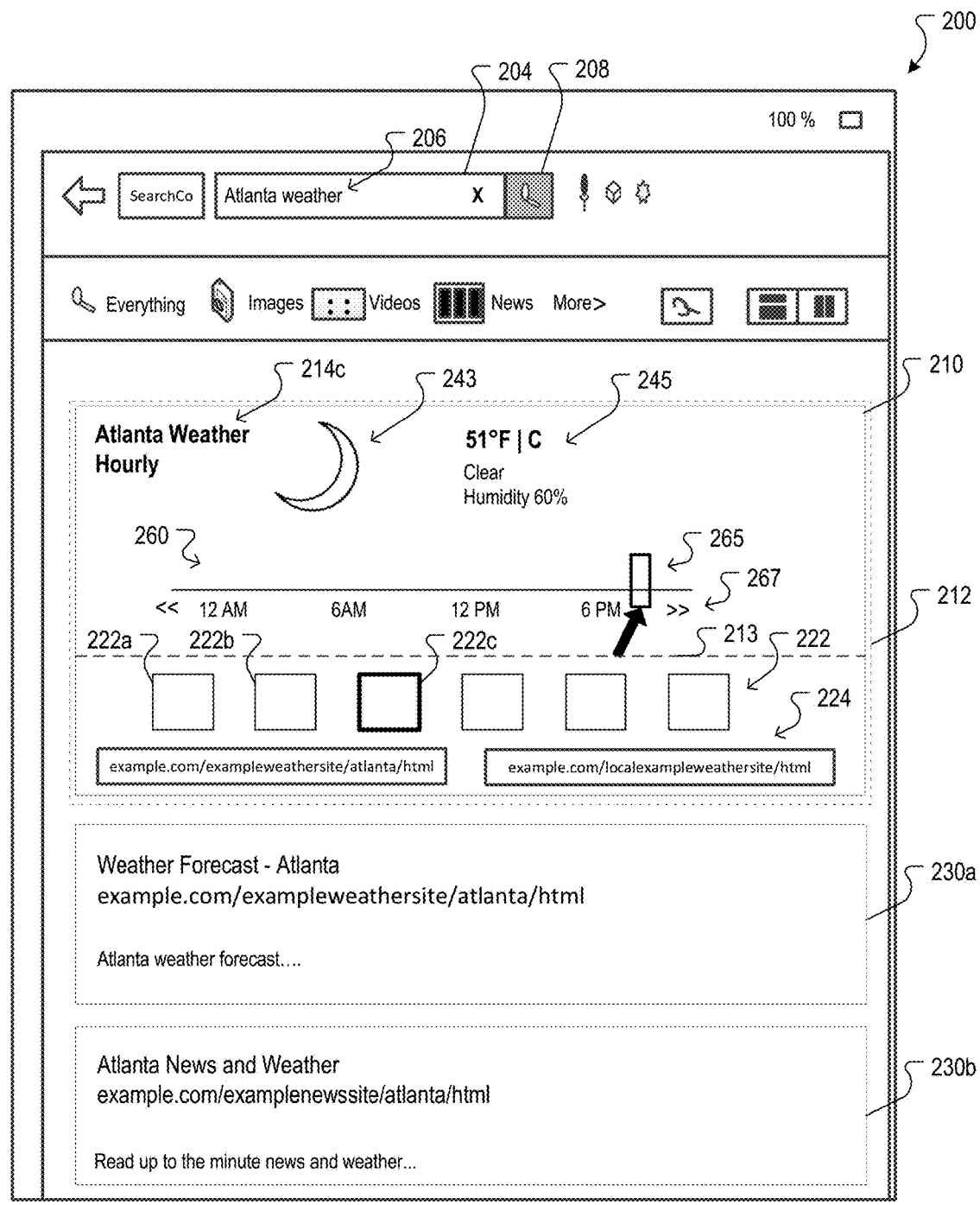

FIGS. 2C and 2D illustrate another card 211c for a search query 206 directed to weather. This card 211c can be presented, for example, in response to a user selection of the card link 222c. With reference to FIG. 2C, the card 211c includes a title 214c for the card 211c, an image 243 indicative of weather conditions, textual content 245 describing the weather conditions, and a time selector tool 260.

The time selector tool 260 is an interactive user interface element that enables a user to select a particular time for which the weather forecast or past weather information is presented. This weather information can be presented using the image 243 and/or the textual content 245. For example, the image 243 indicates a partly cloudy condition and the textual content 245 further indicates that the temperature is 47° F. and the humidity is 65% for the selected time of 9:00 AM.

The user can request weather information for another time by moving a selection window 265 along a timeline 263 to a desired time, or by selecting either the "<<" link or the ">>" link. The user can move the selection window 265 by selecting the selection window 265 using a mouse and moving the mouse in the desired direction along the timeline 263. Or, for touchscreen devices, the user may touch the touchscreen at the selection window 265 using a finger or stylus and move their finger or stylus in the desired direction. The user can select the ">>" to move forward in time, and select the "<<" link to move backwards in time along the timeline 263. Although the example timeline 263 is for times of a day, other answer boxes or cards for an answer box may include a timeline for days of a week or other time periods.

In response to detecting that the selection window 265 has been moved to a different location on the timeline 263, the user device 106 can identify and present weather information for the time corresponding to the updated location of the selection window 265. For example, if the updated time is in the future, the user device 106 can identify weather forecast information for the updated time and update the image 243 and the textual content 245 based on the identified weather forecast information. If the updated time is a historical time, then the user device 106 can identify actual weather information for the updated time and update the image 243 and the textual content based on the actual weather information for that time. This weather information may be received prior to the request for presentation of the information. For example, the additional information may be received when the answer box 210 is initially received by the user device 106, such that the answer box 210 can be updated to present requested information without initiating a request for the information from another resource.

With reference to FIG. 2D, the answer box 210 has been updated to show the weather forecast for Atlanta at 8:00 PM. In particular, the image 243 and the textual content 245 have been updated to indicate the weather forecast for 8:00 PM. For example, the image 243 now depicts a moon rather than a partly cloudy/partly sunny sky. In addition, the textual content 245 indicates, in part, that the temperature is forecasted to be 51° F. at approximately 8:00 PM.

In some implementations, the user device 106, or another data processing apparatus, can be configured to change other characteristics of content that is presented in an answer box, for example based on user interaction with the answer box and/or based on the content selected for presentation in the answer box. For example, the user device 106 may be configured to change the background color or shading based on the time or weather information.

In some implementations, the user device 106 may evaluate weather information that is to be presented by the answer box and select a background color or image to present based on the weather information. For example, the user device 106 may determine whether the weather information specifies sunny conditions, e.g., through inclusion of an image of the sun being included in the weather information, or whether the weather information specifies cloudy or rainy conditions, e.g., through inclusion of an image of clouds or rain drops being included in the weather information.

When the user device 106 determines that the weather information specifies sunny conditions, the user device 106 can select and provide a bright or light background for the answer box, or a card presented in the answer box. When the user device 106 determines that the weather information specifies cloudy or rainy conditions, the user device 106 can select or provide a dark or dull background for the answer box.

The user device 106, or another data processing apparatus, may also be configured to identify the time of day for weather or other information that is to be presented by the answer box and select a background color for the answer box based on the identified time of day. For example, the user device 106 may determine the current time of day using an internal clock of the user device 106, or using data such as a timestamp that is included in data received by the user device 106. Using the time of day, the user device 106 can select and provide a light blue background for the answer box during daytime hours, e.g., at times after sunrise and prior to sunset at the location of the user device 106, and/or a darker blue background for the answer box during nighttime hours, e.g., at times after sunset and before sunrise at the location of the user device 106. The user device 106 may also select the background based on a combination of time of day and weather information. For example, the user device 106 may select a dark blue background for daytime hours when the weather information indicates rain.

The user device 106, or another data processing apparatus, may also be configured to identify the phase of the moon for a time period of weather information and adjust moon images based on the phase of the moon. For example, the user device 106 may access information specifying the phase of the moon for the location of the user device at different times of the year. Using the accessed information, the user device 106 can determine the phase of the moon for the time period, e.g., the day for which weather information is to be presented. In turn, the user device 106 can select and provide moon images for one of a full moon, new moon, or a quarter moon phase, based on the time period for which weather information that is to be presented by the answer box.

In some implementations, the search system 110 provides data to the user device 10, for example along with the answer box, that causes the user device 106 to change the characteristics of the answer box based on time, weather conditions, or moon phases as described above. For example, the data may cause the user device 106 to identify the relevant information, e.g., time, weather, and/or moon phase, and adjust the characteristics, e.g., image shown, background color, etc., based on the identified information.

Figure 3:
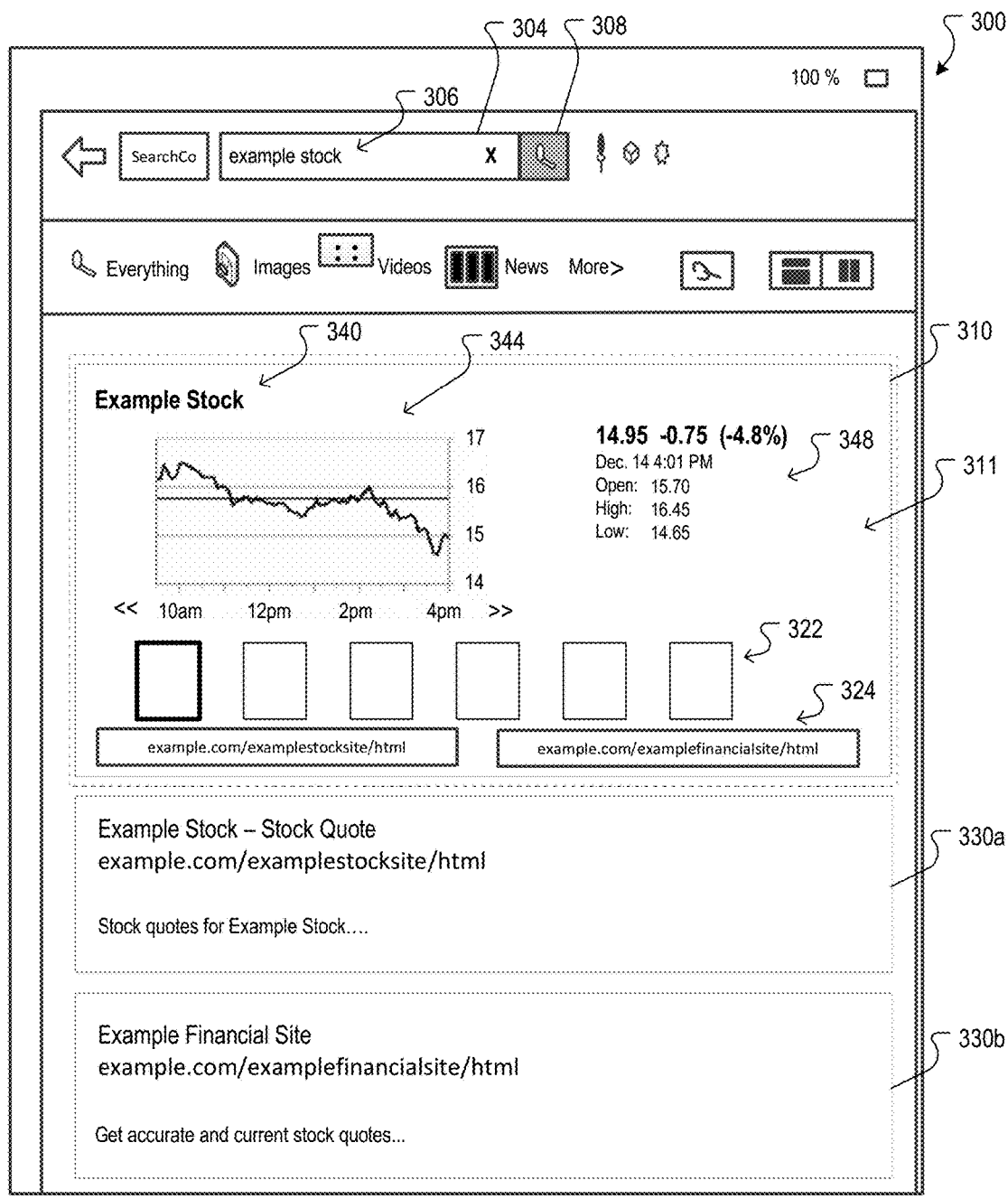
FIG. 3 is a screen shot of another example search interface in which an interactive answer box is presented.

FIG. 3 is a screen shot of another example search interface 300 in which an interactive answer box 310 is presented. The search interface 300 includes a query entry field 304 in which a user can enter a search query 306 and a search initiation element 308 with which the search query 306 can be submitted to the search system 110. The search interface 300 also includes an answer box 310 and search results 330a and 330b.

The example answer box 300 is provided in response to a search query 306 for "example stock." The answer box 310 includes a card 311 that includes relevant content for the example stock, web links 324, and card links 322.

The card 311 includes a title 340, a chart 344 depicting historical pricing information for the example stock, and textual content 348 specifying recent pricing information for the example stock. Other content that may be included in an answer box 310 for a search query directed to stocks or other types of securities may include current market conditions and news for the company that issued the stock to name a couple of examples. If the user that submitted the search query 306 has an account with the search system 110 and is logged into the account, an answer box for a query directed to a stock or other security may also include content related to the user's portfolio, such as a total value, gains or losses, and/or news relevant to the user's portfolio.

The chart 344 enables the user to select a time period for which to display pricing information. For example, the chart includes a ">>" link that, when selected, causes the user device 106 to update the chart 344 with pricing information for a later time period. For example, in response to detecting user interaction with the ">>" link, the user device 106 can select pricing information for a time period following 4 pm and replace at least a portion of the information presented in the chart 344 with the selected information.

The chart 344 also includes a "<<" link that, when selected, causes the user device 106 to update the chart 344 with pricing information for an earlier time period. For example, in response to detecting user interaction with the "<<" link, the user device 106 can select a pricing information for a time period prior to 10 am and replace at least a portion of the information presented in the graph 344 with the selected pricing information.

As described above, when one of the links "<<" or ">>" are selected, the user device 106 can access pricing information for the appropriate time period and update the chart 344 accordingly. Additionally, or alternatively, the chart 344 could include a time bar including a slider that enables a user to select a period of time for which pricing information is to be presented. In response to detecting user interaction with the slider, the user device 106 can determine a time period for which pricing information is to be presented, e.g., based on a position of the slider bar on the time bar, and access the pricing information for presentation in the chart 344. The pricing information that is accessed by the user device 106 can be pricing information that was previously downloaded and stored on the user device 106, for example, when the search results 330a and 330b were previously received. Thus, the additional pricing information can be accessed from memory within the user device 106 without initiating another request for pricing information from a web resource.

In some implementations, the content presented by cards of a financial security answer box can be selected by a user. For example, the card received from the search system 110 may provide a user interface that enables a user to select certain stocks for receiving pricing information. This pricing information may be provided in an answer box card when a financial security answer box is provided to the user. For example, if the user submits a query for "example stock," the search system 110 may determine that the query is related to a financial security, e.g., using query categorization techniques, and determine that a financial security card should be presented in the answer box in response to the query. In turn, the search system 110 may select a financial security answer box cards for presentation in the answer box.

For example, the search system 110 may select an initial card for presenting general content related to the query "example stock" and an additional card for presenting pricing information related to the query "example stock." The search system 110 may also identify content for populating the cards for the selected answer box, including the general content for the initial card and pricing information for the additional card. The pricing information may include pricing information for an initial time period that may be presented when the additional card is presented and pricing information for additional time periods that may be presented in response to a user interaction with the answer box. The search system 110 may provide the selected answer box, cards, general content and pricing information to the user device 106 for presentation to a user.

Figure 4:
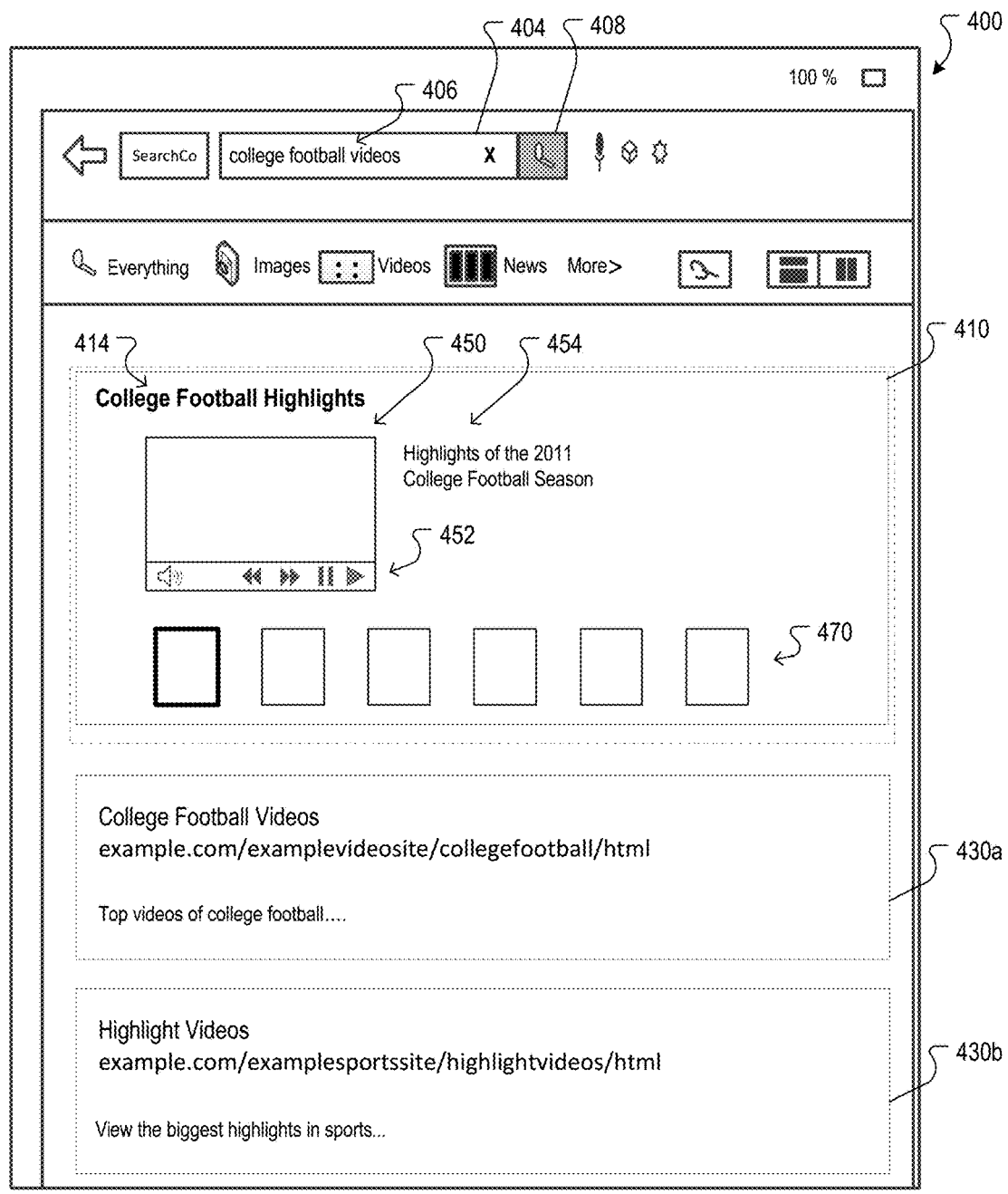
FIG. 4 is a screen shot of another example search interface in which an interactive answer box is presented.

FIG. 4 is a screen shot of another example search interface 400 in which an interactive answer box 410 is presented. The search interface 400 includes a query entry field 404 in which a user can enter a search query 406 and a search initiation element 408 with which the search query 406 can be submitted to the search system 110. The search interface 400 also includes an answer box 410 and search results 430a and 430b.

The example answer box 410 is provided in response to a search query 406 for a "college football videos." The answer box 410 includes a title 414 for the answer box 410, a video 450 having controls 452, textual content 454 describing the video 450, and additional videos 470 that can be presented in the answer box 410 without navigating away from the search interface 400.

A user can view and control play of the video 450 in the answer box 410. For example, the controls 452 include a volume control, a play icon, a pause icon, a rewind icon, and a fast forward icon. The user can control the play of the video using the controls 452. For example, the user device 106 may be configured to adjust the volume of the video 450 in response to the receiving an adjustment to the volume control. By way of another example, the user device 106 may also start and pause a video in response to receiving a selection of the play icon and pause icon, respectively.

The user can also access the other videos 470 by selecting the videos 470. For example, in response to the user selecting a video, the video 450 may be replaced by the selected video. The video 450 and the additional videos 470 may be received by the user device 106 when a search results page that includes the search interface 400 is received, such that the videos 470 may be presented without initiating a request for the video from another resource in response to selection of the video in the answer box 410. For example, the video and the additional videos 470 may be stored on the user device 106.

FIGS. 5A-5D are screen shots of another example search interface 500 in which an interactive answer box 510 is presented. The search interface 500 includes a query entry field 504 in which a user can enter a search query 506 and a search initiation element 508 with which the search query 506 can be submitted to the search system 110.

The example answer box 510 and several search results 530A-530B are provided in response to a search query 506 for "Famous Singer." The answer box 510 includes content such as a title 540, an image 541 of "Famous Singer" and textual content 542 regarding "Famous Singer." The content that is presented together in the answer box 510 is collectively referred to as a "card" or "information card" that is presented in the answer box 510, and can be indexed to a same card identifier. Information that is grouped together to form a card can be grouped based on an information category, e.g., biographical information, location information, historical information, news, images, or other categories of information, to which the information belongs.

Cards that are available for presentation in answer boxes, such as answer box 510, may be presented in response to queries for a particular conceptual entity, such as a person, place, country, landmark, animal, historical event, organization, business, or sports team. In general, answer boxes for single conceptual entities include content that has been identified as relevant to the entity. For example, the card presented in the answer box 510 includes the image 540 of "Famous Singer" and the textual content 542 that includes general information about "Famous Singer."

Cards for a single conceptual entity can be selectively presented to sequentially provide different types of content regarding the entity. For example, an initial card may be presented in the answer box 510 and provide general content, such as an image and brief textual content regarding the entity, similar to the information presented in example answer box 510. Additional cards may include more specific, or more general, information, images, videos, audio, maps, or other content and may depend on the type of entity. For example, the search system 110 may maintain one or more templates for each type of entity for which answer boxes are provided. Each template may include a particular type of content, such as images or videos.

Cards for a person, such as "Famous Singer," can include a card having biographical information, such as birth date, birth place, personal facts, career highlights, awards, works of art, and/or a list of credits, e.g., movie credits. Another card for a person may include images of the person or images associated with the person. If the person is a musician or singer, a card for the person may include an audio player that enables the user to stream music composed by the person. If the person is an actor, a card for the person may include videos associated with the person, and/or a list of movie and/or television show credits for the person. Different types of information can be presented on different cards so that the information on a particular card can all be a particular type of information, e.g., images.

Cards for a place or country may include cards that include one or more images of the place of landmarks associated with the place, a map of the place, a description of the place, facts about the place, a listing of related queries. Cards for a business may include cards that include an image or company logo associated with the business, a description of the business, images of products or services offered by the business, a map to the business, information about and/or images of the leaders of the business, and/or stock pricing information if appropriate.

Figure 5A:
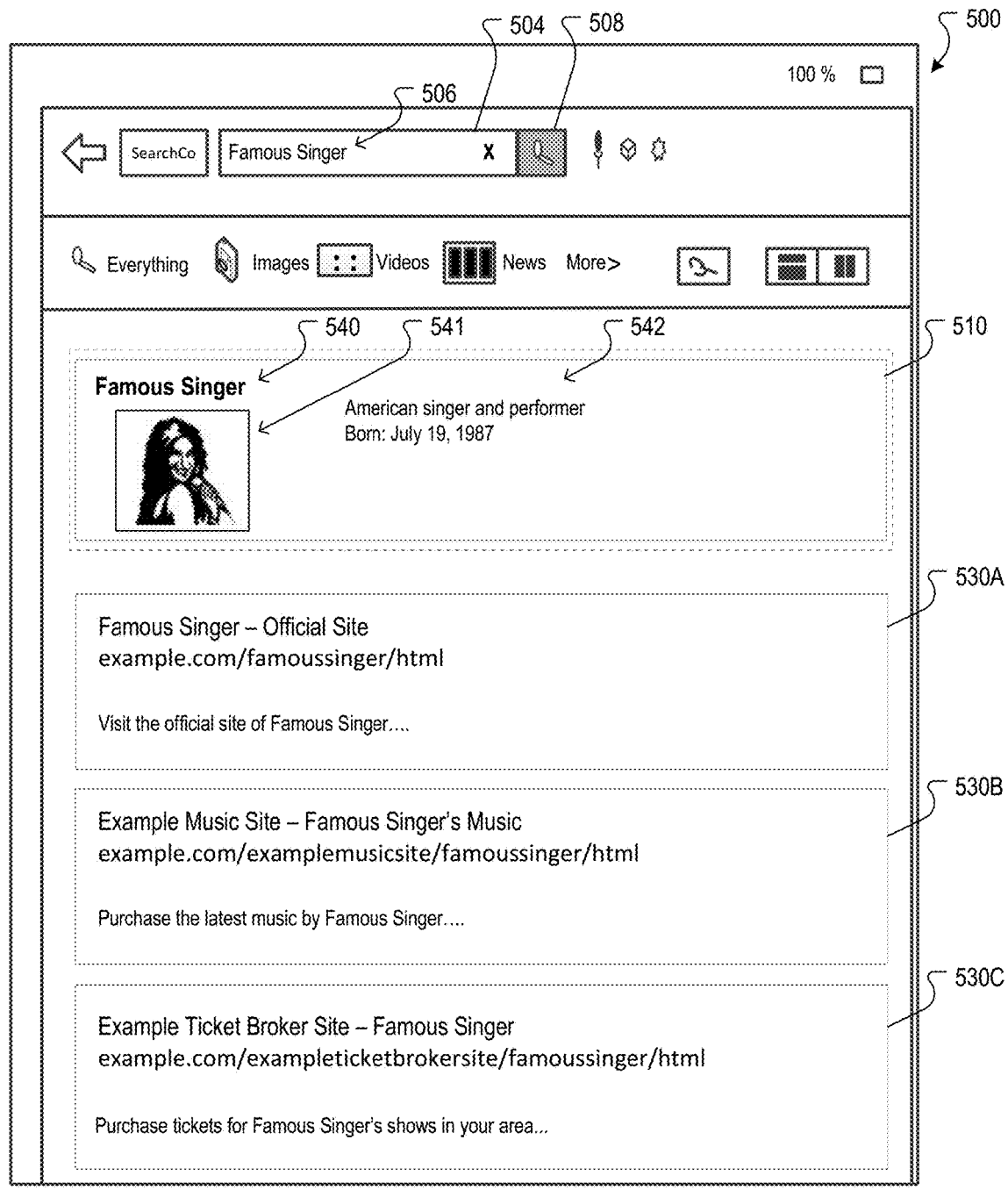
FIGS. 5A-5D are screen shots of another example search interface in which an interactive answer box is presented.
Figure 5B:
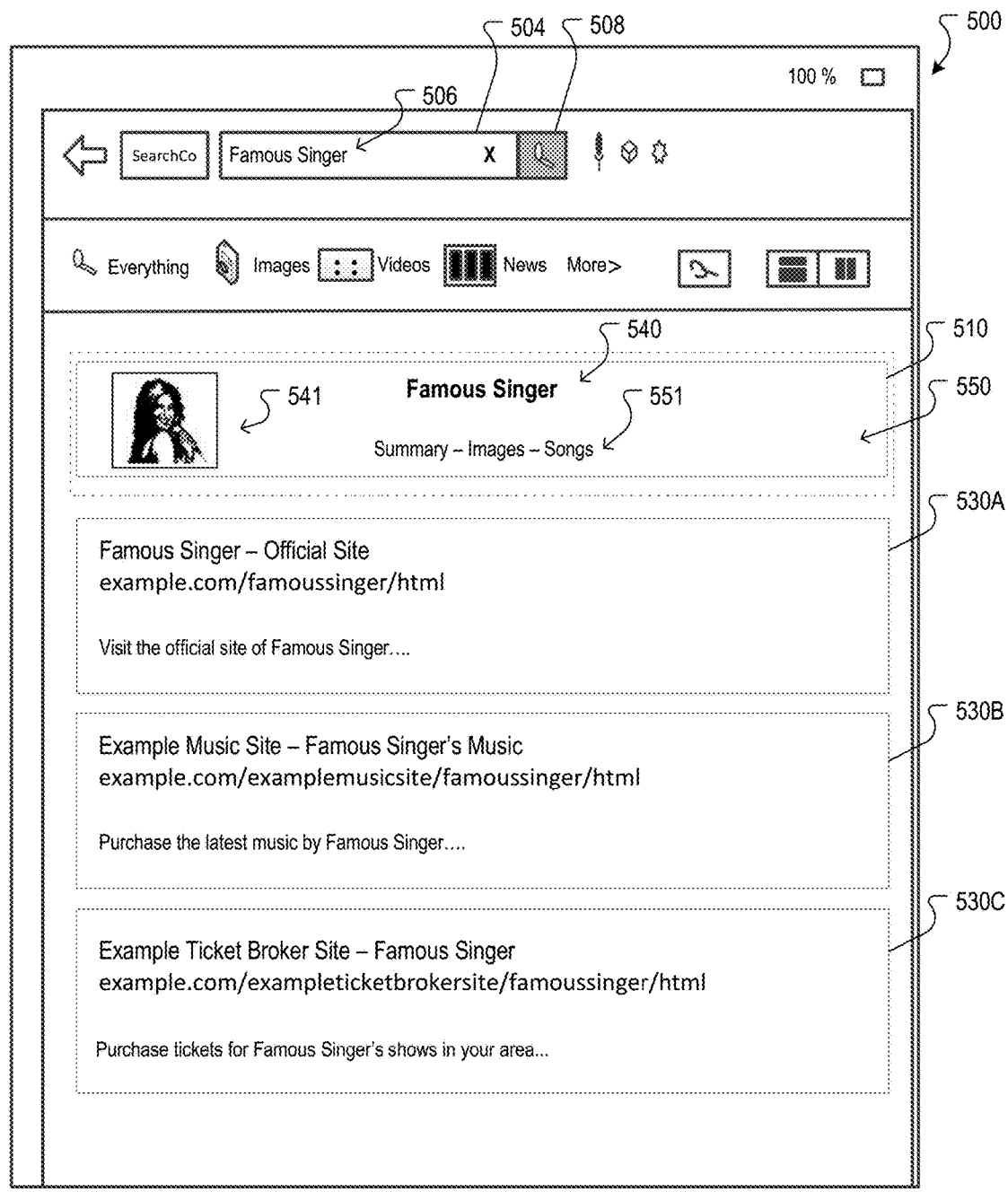
Figure 5C:
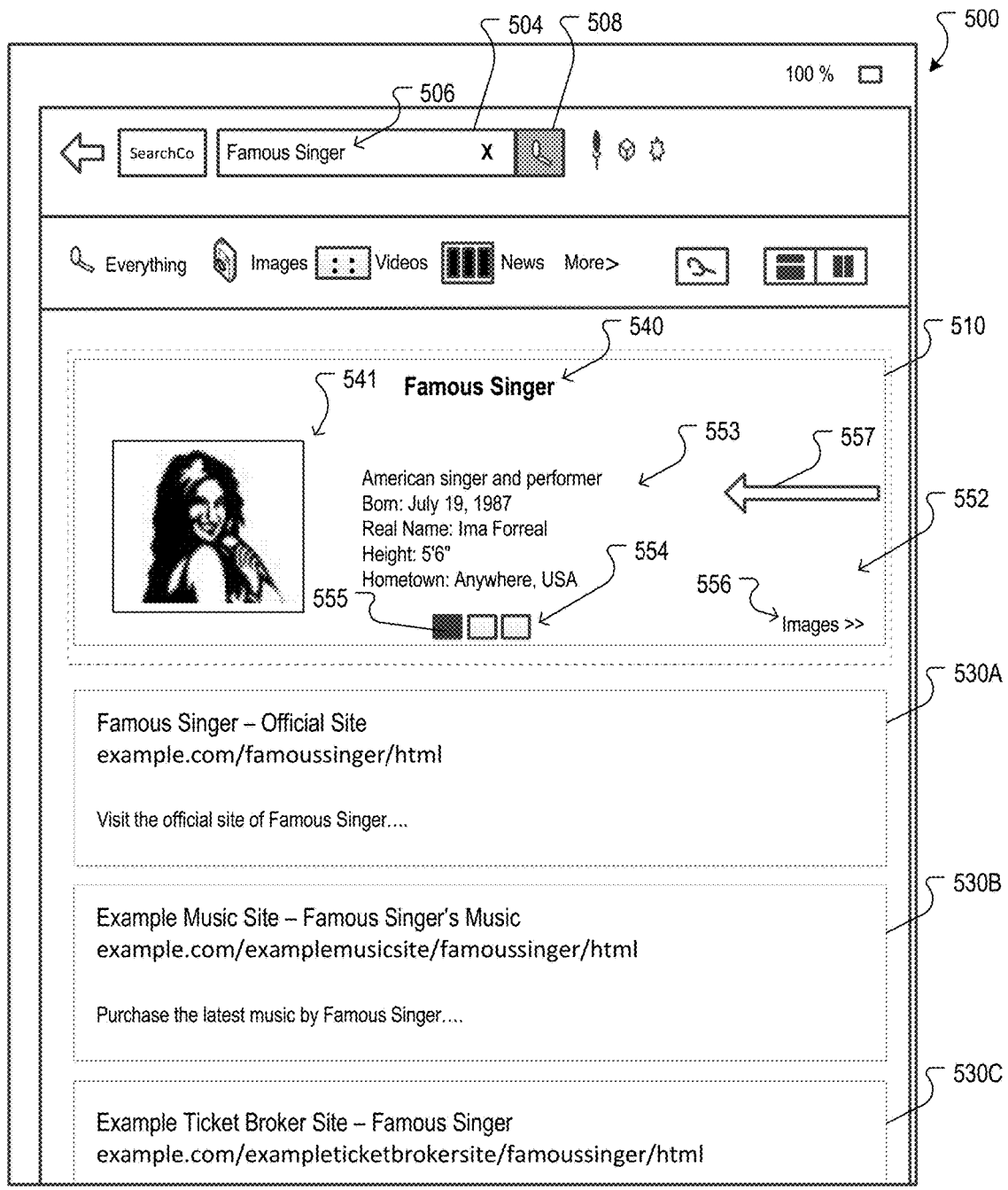

In some implementations, the answer box 510 initially presents a "notice card" 550, as illustrated by FIG. 5B. The notice card 550 is a card that informs a user that additional information is available for presentation without navigating away from the search interface 500. For example, the notice card 550 can again include the title 540 and an image 541 of "Famous Singer". However, instead of including the textual information 542, as illustrated by FIG. 5A, the notice card 550 may include a list of other cards 551 that are available for presentation in the answer box 510. For example, the notice card 550 includes the list of other cards 551 specifying that a "summary" card, a "songs" card, and an "images" card are available for presentation in the answer box 510. The notice card 550 can be presented in a smaller answer box 510 than other cards, e.g., summary, songs, or images cards, are presented, thereby leaving more space for other search results until a user expresses interest in viewing information in the answer box 510.

In some implementations, a user can express interest in viewing information in the answer box 510 by interacting with the answer box 510. For example, a user may "tap," or click, or otherwise select, a location in the answer box to request presentation of information in the answer box. In response to user interaction with the answer box 510, the answer box 510 can expand to present additional content for a card.

In some implementations, the answer box 510 can expand in response to a "tap" or "click" within the answer box 510 or at an icon within the answer box 510. For example, the user device 106 can determine that a user "tap" has occurred when the user device 106 determines that a pointer has engaged a touch screen interface at a particular location, e.g., within the answer box 510, and disengaged the touch screen within a threshold distance of the particular location, e.g., at the same particular location or within a specified number of pixels from the particular location.

When a user tap or click occurs within the answer box 510, the user device 106 can expand the answer box 510 to reveal additional or different content. For example, with reference to FIG. 5C, the answer box 510 has expanded and the initial content presented in the answer box 510, i.e., the notice card 550, has been replaced with the summary card 552. The summary card 552 again includes the title 540, the image of "Famous Singer" 541, and further includes textual information 553 about "Famous Singer." When the answer box 510 is expanded, the other search results 530A-530C may be shifted down the display, and/or the answer box 510 can be expanded to fill the entire display such that the other search results 530A-530C are moved off of the visible page, e.g., to a page location that is below the bottom of the current display. When the other search results 530A-530C are moved off of the display, the user can still scroll down the page to cause the search results to again be presented.

In some implementations, a card can also include information about other cards that are available for presentation. For example, the card 552 includes a "card count" element 554 indicating that additional cards are available for presentation. For example, the card count element 554 indicates that three cards are available for presentation by presenting three boxes at the bottom of the card 552. The card count element 554 can also indicate the relative position of the card 552 that is being presented. For example, the card count element 554 includes a shaded box 555 indicating that the user is currently viewing a first card, assuming that order is determined from left to right, and that there are two other cards available to the right of the card 552, e.g., as indicated by the two non-shaded boxes. The card 552 also includes a next card element 556 that indicates a card type for the next card that is available for presentation.

Figure 5D:
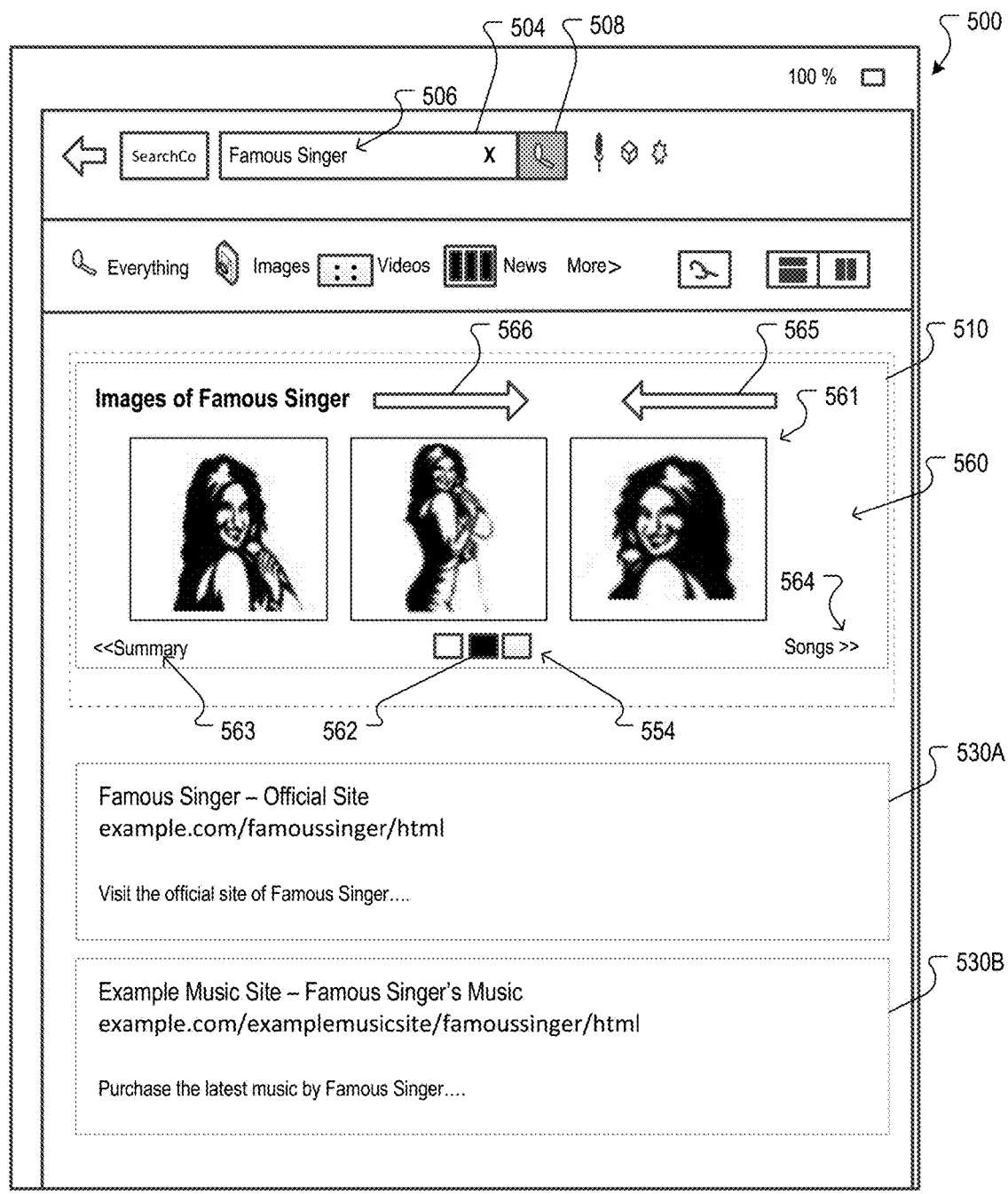

To view the additional cards in the answer box 510, the user may tap the next card element 556 or perform a swipe across the answer box 510. For example, in order to view the next card to the right of the card 552, the user can swipe across the answer box 510 in the direction of arrow 557. In response to detecting a swipe within the answer box 510 and in the direction of the arrow 557, the user device 106 may replace the summary card 552 with an image card 560 that includes several images 561 of "Famous Singer." As illustrated in FIG. 5D, when the image card 560 is presented, the card count element 554 can be updated to indicate the relative position of the image card 560, e.g., among all available cards. For example, the box 562 has been shaded to indicate that the image card 560 is a second card in the available cards, while the two unshaded boxes indicate that there is an available card to the left of the image card 560 and an available card to the right of the image card 560.

The image card 560 also includes next card elements 563 and 564. The next card element 563 indicates that the summary card 552 is to the left of the image card 560 and that the songs card, e.g., a card that includes a list of songs recorded by "Famous Singer," is to the right of the image card 560. As described above, a user can request presentation of the summary card or the songs card by interacting with, e.g., "tapping," the next card elements 563 or 564, respectively. Additionally, detection of a user swipe in the direction of arrow 565 can cause the user device to present the songs card, while detection of a user swipe in the direction of arrow 566 can cause the user device to again present the summary card 552. Thus, detection of a user swipe will cause the image card 560 to be replaced by one of the other available cards without navigating away from the search results page, e.g., without submitting a resource request over the network.

Figure 6:
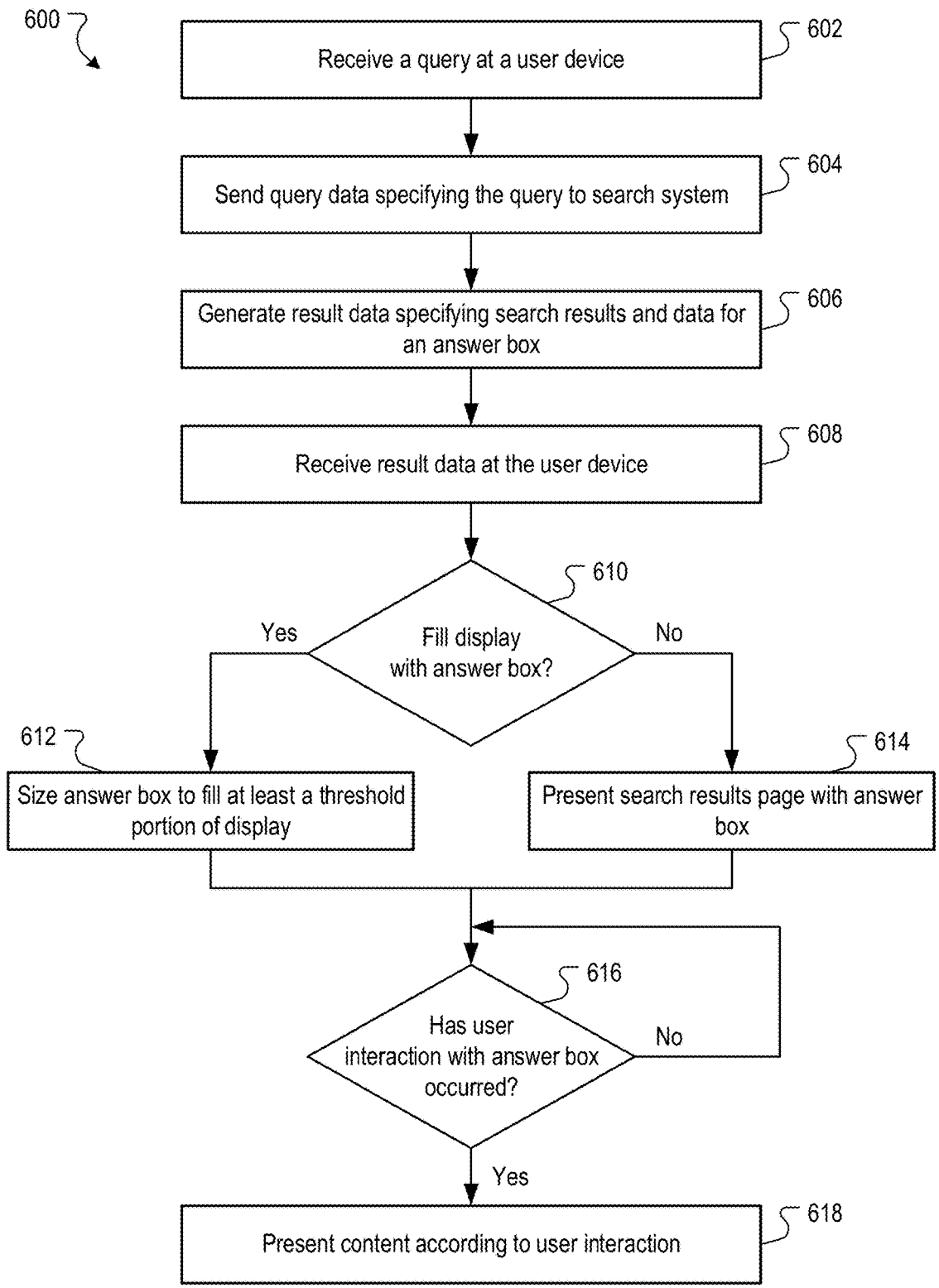
FIG. 6 is a flow chart of an example process for presenting content in an interactive answer box.

FIG. 6 is a flow chart of an example process 600 for presenting content in an interactive answer box. A query 109 is received at a user device, such as the user device 106 of FIG. 1 (602). For example, a user may enter the query 109 in a query entry field of a search interface. Query data specifying the received query 109 is sent from the user device 106 to the search system 110 (604).

The search system 110 generates result data that specifies search results 111 and at least one answer box (606). For example, the search system 110 may identify the received search query 109 as an appropriate query for providing an answer box. The search system 110 may identify resources relevant to the received query 109, generate search results 111 that reference the identified resources, and include the search results 111 in the result data. The search system 110 may also identify content for presenting in the answer box and include the content with the result data.

As discussed above, the content for the answer box may include initial content and additional content. The search system 110 may specify which of the identified content for the answer box is initial content and which of the identified content is additional content in the result data. The search system 100 may also identify cards and/or templates for the answer box. The cards may be selected based, at least in part on information that is associated with a user identifier for the user that submitted the query 109.

Figure 7:
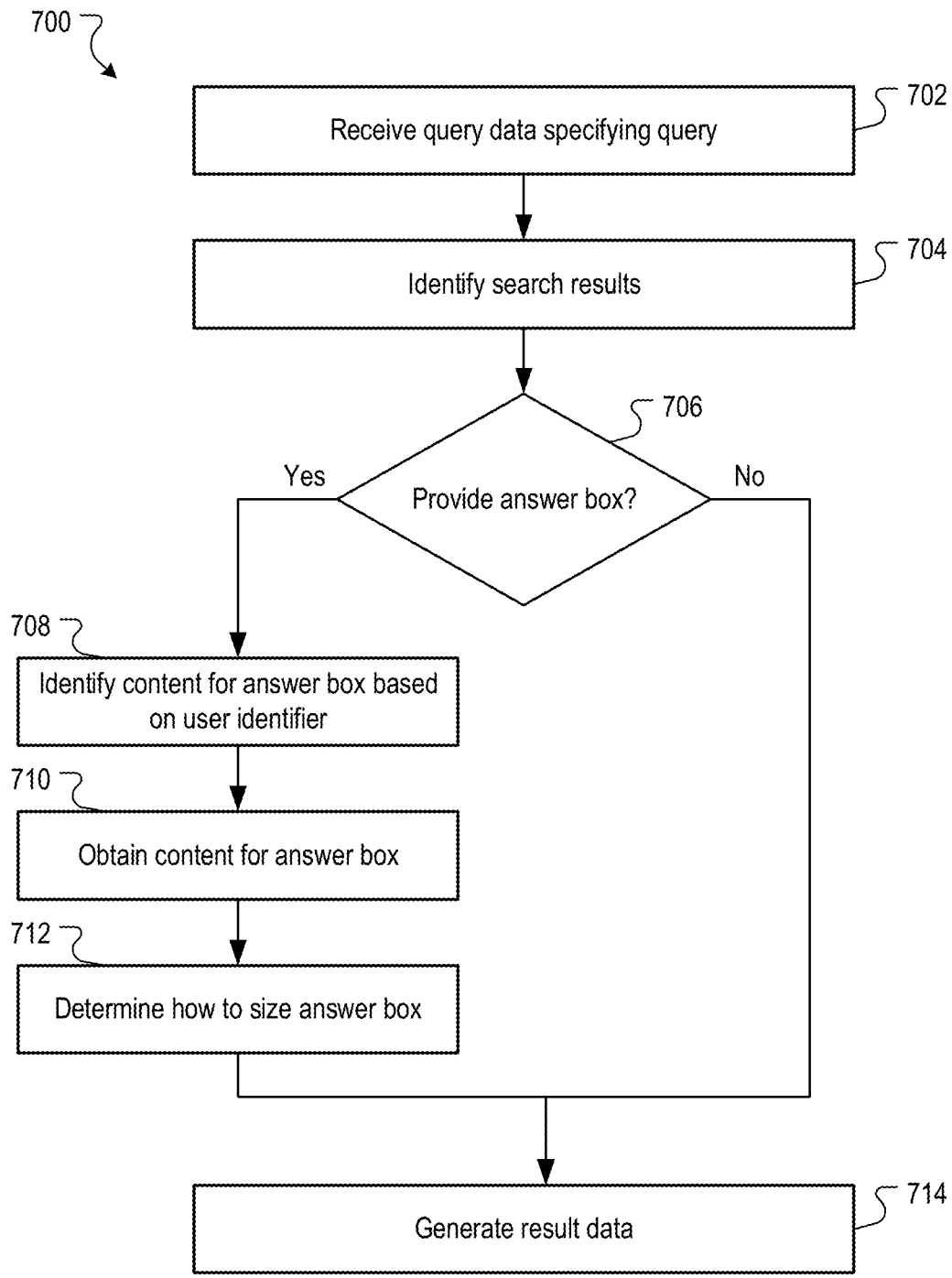
FIG. 7 is a flow chart of an example process for generating result data.

The result data may also include data specifying the presentation format for the search results 111 and the answer box. For example, the search system 110 may specify that the answer box is to be presented at the top of the search results page 114 and the search results 111 are to be presented below the answer box based on rank. Or, the search system 110 may specify that the answer box is to fill at least a threshold portion, e.g., 90% or 100%, of the search results page 114 or the display of the user device 106. An example process for generating result data is illustrated in FIG. 7 and described below.

The result data is received at the user device (608). For example, the search system 110 may transmit the result data to the user device 106 from which the query 109 was submitted. The result data can include the initial content for the answer box, the additional content for the answer box, the search results 111, and the data specifying the presentation of the search results 111 and the answer box.

A determination is made whether to fill at least a threshold portion of the search results page 114 or display (610). For example, the user device 106 may identify the data specifying the presentation of the search results 111 and answer box and determine how to size the answer box based on the data. If the user device 106 determines that the answer box should fill the threshold portion of the search results page 114 or display, the user device 106 sizes the answer box in a manner such that the answer box fills at least the threshold portion of the search results page 114 or display (612).

If the user device 106 determines that the answer box should not fill the threshold portion of the search results page 114 or display, the user device 106 presents the search results page with the answer box as a search result position (614). For example, the answer box may be presented at the top of the search results page 114 and above the search results 111.

Regardless of how the answer box is sized, the answer box can present initial content as specified by the search system 110. For example, the answer box may present an initial card having the initial content. The answer box may also present one or more presentation control user elements, for example if the template for the answer box includes a presentation control user element.

A determination is made whether user interaction with the answer box has occurred (616). In some implementations, the user interaction is a user interaction that is indicative of a request for additional content. For example, the user interaction may be a selection of a card link presented in the answer box. By way of another example, the user interaction may be a user interaction with a presentation control element, such as a slider bar.

In some implementations, the user interaction that is indicative of a user request for additional content is a user swipe within the answer box. The user swipe can be determined to have occurred in response to detecting a pointer at multiple locations along a path that extends between two display points within the answer box, where at least two of the multiple locations at which the pointer has been detected are at least a threshold distance apart.

In some implementations, the user interaction is a user interaction for controlling content presented in the answer box. For example, the user interaction may be receiving a selection of a play control icon for a video or a volume adjustment for the video.

Content is presented according to the user interaction (618). If the user interaction is indicative of a request for additional content, the user device 106 can identify the additional content and present the additional content within the answer box, for example without initiating a request from another resource. For example, the additional content may be stored on the user device 106 after being received with the result data. The user device 106 can locate the additional content and update the answer box to present the additional content. In some implementations, the user device replaces the initial content with the additional content. For example, the user device 106 may replace an initial card having the initial content with another card having the additional content requested by the user, as described in detail above.

If the user interaction is a user interaction for controlling the content, the user device 106 can condition the presented content based on the user interaction. For example, if the user interaction is a request to play a video, the user device 106 may access the video content and stream the video in the answer box. If the user interaction is an adjustment to the volume of a video, the user device 106 may condition the volume of the video according to the user interaction.

FIG. 7 is a flow chart of an example process 700 for generating an answer box. Query data defining a query 109 is received (702). For example, a user device 106 may transmit the query data to the search system 110. The query data can specify the query 109 and optionally a user identifier. For example, the query data may include a user identifier for a user if the user is logged into an account with the search system 110. In some implementations, the query data may include information identifying the type, e.g., mobile or non-mobile, of device that submitted the query 109.

Search results 111 are identified (704). For example, the search system 110 may identify resources that are relevant to the query 109 and generate search results 111 for resources having at least a threshold relevance score for the query 109. The relevance score for each resource may be based on an IR score for the resource, for example. The search system 110 may also rank or order the search results 111 based on the relevance scores for the resources that they reference.

A determination is made whether to provide an answer box in response to the query (706). For example, the search system 110 may determine whether to provide an answer box for the query 109. In some implementations, the search system 110 determines whether to provide an answer box based on a type of query 109 that has been received. For example, the search system 110 may provide answer boxes for queries that have been identified as informational queries, but not for queries that have been identified as navigational queries.

In some implementations, the search system 110 may determine whether to provide an answer box based on user profile information for the received user identifier. For example if the user rarely interacts with answer boxes as indicated by the user profile for the user, the search system 110 may determine not to provide an answer box for queries submitted by that user.

If a determination is made to provide an answer box, content for the answer box is identified (708). For example, the search system 110 may identify content to provide in the answer box. The search system 110 can identify the content based, in part, on the category for the query 109. The category for the query 109 is a classification of content for the query and can be determined based on text in the query 109 or other conventional techniques, e.g., clustering techniques, as described above. Example categories for queries include weather, financial security information, audio, video, people, places, landmarks, animals, and show times, e.g., movie listings, to name a few. By way of example, if a query 109 includes the text "weather in . . . ," the search system 110 may categorize the query 109 as a weather query.

The search system 110 may have one or more answer box templates for each of a set of query categories. Each template may present certain types of content, such as images, text, and/or videos. Based on the template for the answer box, the search system 110 can identify appropriate content for populating the template.

The search system 110 also identifies the content for the answer box based on the query 109 itself. For example, the search system 110 identifies content that is relevant to the query 109 and conforms to the template for the answer box. If the query 109 is for "weather in New York" and the template includes an image of current weather conditions for a particular location, the search system 110 can identify the current weather in New York and identify an image that corresponds to the current weather conditions in New York. For example, the search system 110 may identify this content in the search index 112 or at a weather web site.

If an answer box includes multiple cards, the search system 110 can identify content for each of the cards in a similar manner. For example, the answer box may include cards for information that the user may later request, such as weather forecasts for a later time or an hourly forecast having additional weather details. This search system 110 can identify weather forecast information for the additional cards.

Content for the answer box is obtained (710). For example, the search system 110 may request the identified content for the answer box. In some implementations, the content for an answer box may be obtained from one or more web sites.

A determination is made how to size the answer box (712). For example, the search system 110 may determine how to size the answer box based on a confidence measure that indicates a likelihood that the content for the answer box is responsive to the query 109. If the confidence measure exceeds a threshold, the search system 110 may specify that the answer box is to be sized in a manner that the answer box fills at least a threshold portion of a search results page 114 or a display of a user device that submitted the query 109. If the confidence measure does not exceed the threshold, the search system 110 may specify that the answer box be sized similar to the search results 111.

In some implementations, the search system 110 determines how to size an answer box based on the type of device from which the query 109 was submitted. For example, the search system 110 may determine that an answer box for a mobile device be sized in a manner that the answer box fills at least a threshold portion of a search results page 114 or a display of a user device 106 that submitted the query 109. The search system 110 may determine that an answer box for a non-mobile device be sized similar to the search results 111.

Result data defining search results are generated (714). For example, the search system 110 may generate result data specifying the identified search results 111 and an answer box if an answer box is to be provided. The result data may include the identified search results 111, a ranking for the identified search results 111, a template and/or cards for the answer box, content for populating the answer box, and information specifying how the answer box should be sized.

In some implementations, the result data includes data that cause presentation of initial content in the answer box, while preventing presentation of additional content prior to user interaction with the answer box. For example, the result data may include data that cause an initial card to be presented in the answer box, while other cards may only be presented following user interaction with card links or a user swipe across the answer box.

Figure 8:
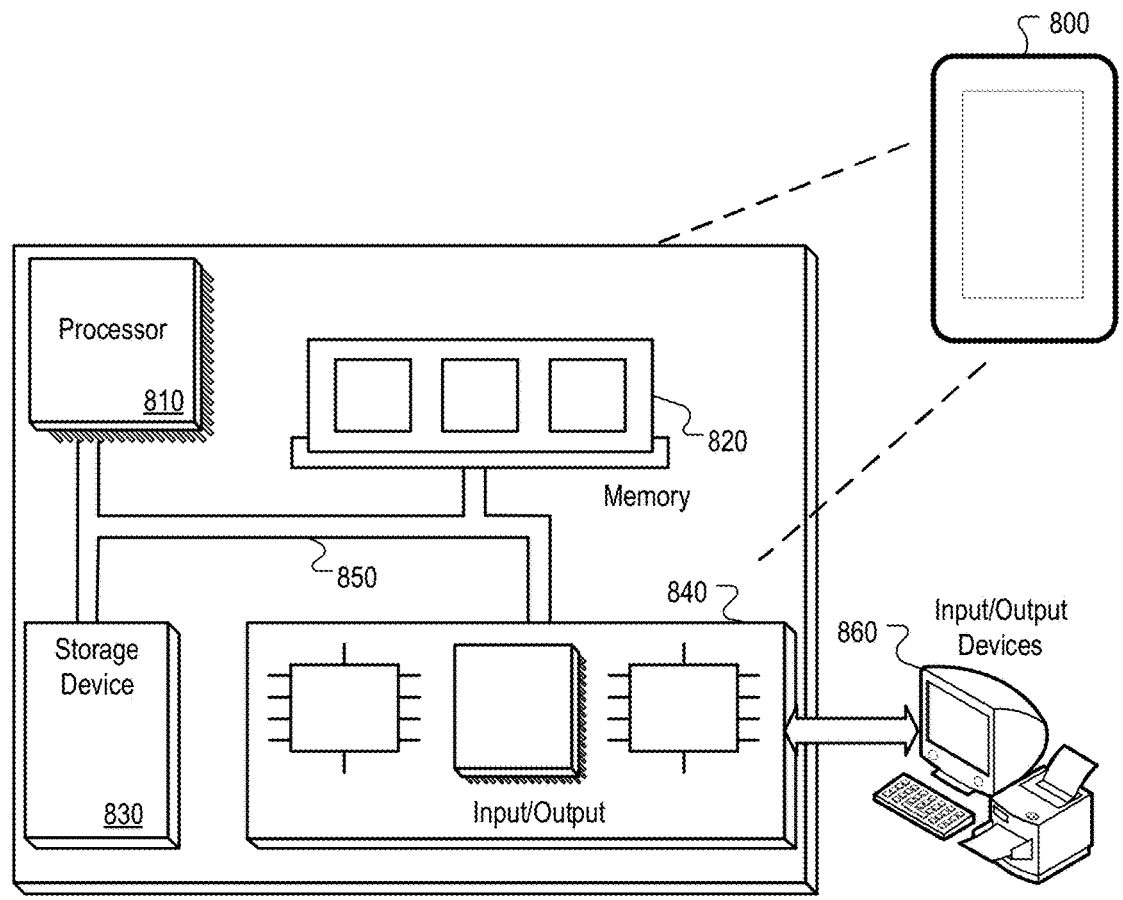
FIG. 8 is a block diagram of an example computer system.

FIG. 8 is block diagram of an example computer system 800 that can be used to perform operations described above. The system 800 includes a processor 810, a memory 820, a storage device 830, and an input/output device 840. Each of the components 810, 820, 830, and 840 can be interconnected, for example, using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 can include, for example, a hard disk device, an optical disk device, a storage device that is shared over a network by multiple computing devices, e.g., a cloud storage device, or some other large capacity storage device.

The input/output device 840 provides input/output operations for the system 700. In one implementation, the input/output device 840 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 860. Other implementations, however, can also be used, such as mobile computing devices, mobile communication devices, set-top box television client devices, etc.

Although an example processing system has been described in FIG. 8, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media, e.g., multiple CDs, disks, or other storage devices.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program, also known as a program, software, software application, script, or code, can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork, e.g., the Internet, and peer-to-peer networks, e.g., ad hoc peer-to-peer networks.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML, page, to a client device, e.g., for purposes of displaying data to and receiving user input from a user interacting with the client device. Data generated at the client device, e.g., a result of the user interaction, can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   receiving, by a user device of a user and in response to submission of a query that references an entity, (i) a plurality of display cards for presentation within an answer box of a search results page and (ii) a plurality of search results for the query, each display card including a different type of content that has been identified as being related to the entity referenced by the query and wherein at least a portion of the display cards is selected to present types of content requested by users in follow-up queries that have followed submission of queries that reference the entity referenced by the query;
   presenting, by the user device and within the answer box of the search results page, a first display card having a first type of content related to the entity referenced by the query;
   presenting, by the user device and within a search results area of the search results page, the plurality of search results;
   storing each of the plurality of display cards in local memory of the user device;
   determining, by the user device, that a user interaction with the answer box has occurred; and
   in response to determining that the user interaction has occurred:
      retrieving, from the local memory of the user device, a second display card having a second type of content different from the first type of content; and
      presenting, by the user device and within the answer box, the second display card while maintaining presentation of the search results, wherein the second display card was not presented prior to the user interaction.

2. The method of claim 1, wherein each display card includes a template for presenting a particular type of content different from a particular type of content for each other display card.

3. The method of claim 1, wherein each display card of the plurality of display cards is selected for the answer box based on a category to which the query belongs.

4. The method of claim 1, wherein the second type of content includes content requested by at least a threshold number of users following submission of the query by users.

5. The method of claim 1, wherein the plurality of display cards include a particular number of display cards selected based on a user preference of a user of the user device.

6. The method of claim 1, wherein presenting the first display card within the answer box includes presenting, on the search results page, the answer box to visually appear as a native application hosted by a web site referenced by a search result for the query.

7. The method of claim 1, further comprising:
   determining a type of the user device at which the answer box will be presented; and
   determining a presentation size for the answer box based on the type of the user device at which the answer box will be presented.

8. The method of claim 1, wherein the answer box includes an interactive chart that presents first data for a given time period and an interface control for adjusting the given period for which data is presented by the interactive chart, the method further comprising:
   detecting a user interaction with the interface control;
   identifying an updated time period for the interactive chart based on the detected user interaction; and
   updating the interactive chart to present second data for the updated time period without navigating from the search results page and while maintaining presentation of the search results.

9. The method of claim 1, wherein the first data and the second data are received with the display cards and the search results.

10. A system, comprising:
    a data processing apparatus; and
    a memory storage apparatus in data communication with the data processing apparatus, the memory storage apparatus storing instructions executable by the data processing apparatus and that upon such execution cause the data processing apparatus to perform operations comprising:
       receiving, by a user device of a user and in response to submission of a query that references an entity, (i) a plurality of display cards for presentation within an answer box of a search results page and (ii) a plurality of search results for the query, each display card including a different type of content that has been identified as being related to the entity referenced by the query and wherein at least a portion of the display cards is selected to present types of content requested by users in follow-up queries that have followed submission of queries that reference the entity referenced by the query;
       presenting, by the user device and within the answer box of the search results page, a first display card having a first type of content related to the entity referenced by the query;
       presenting, by the user device and within a search results area of the search results page, the plurality of search results;
       storing each of the plurality of display cards in local memory of the user device;
       determining, by the user device, that a user interaction with the answer box has occurred; and in response to determining that the user interaction has occurred:
retrieving, from the local memory of the user device, a second display card having a second type of content different from the first type of content; and
presenting, by the user device and within the answer box, the second display card while maintaining presentation of the search results, wherein the second display card was not presented prior to the user interaction.

11. The system of claim 10, wherein each display card includes a template for presenting a particular type of content different from a particular type of content for each other display card.

12. The system of claim 10, wherein each display card of the plurality of display cards is selected for the answer box based on a category to which the query belongs.

13. The system of claim 10, wherein the second type of content includes content requested by at least a threshold number of users following submission of the query by users.

14. The system of claim 10, wherein the plurality of display cards include a particular number of display cards selected based on a user preference of a user of the user device.

15. The system of claim 10, wherein presenting the first display card within the answer box includes presenting, on the search results page, the answer box to visually appear as a native application hosted by a web site referenced by a search result for the query.

16. A non-transitory computer storage medium encoded with a computer program, the program comprising instructions that when executed by a data processing apparatus cause the data processing apparatus to perform operations comprising:
receiving, by a user device of a user and in response to submission of a query that references an entity, (i) a plurality of display cards for presentation within an answer box of a search results page and (ii) a plurality of search results for the query, each display card including a different type of content that has been identified as being related to the entity referenced by the query and wherein at least a portion of the display cards is selected to present types of content requested by users in follow-up queries that have followed submission of queries that reference the entity referenced by the query;
presenting, by the user device and within the answer box of the search results page, a first display card having a first type of content related to the entity referenced by the query;
presenting, by the user device and within a search results area of the search results page, the plurality of search results;
storing each of the plurality of display cards in local memory of the user device;
determining, by the user device, that a user interaction with the answer box has occurred; and
in response to determining that the user interaction has occurred:
retrieving, from the local memory of the user device, a second display card having a second type of content different from the first type of content; and
presenting, by the user device and within the answer box, the second display card while maintaining presentation of the search results, wherein the second display card was not presented prior to the user interaction.

17. The non-transitory computer storage medium of claim 16, wherein each display card includes a template for presenting a particular type of content different from a particular type of content for each other display card.

18. The non-transitory computer storage medium of claim 16, wherein each display card of the plurality of display cards is selected for the answer box based on a category to which the query belongs.

19. The non-transitory computer storage medium of claim 16, wherein the second type of content includes content requested by at least a threshold number of users following submission of the query by users.

20. The non-transitory computer storage medium of claim 16, wherein the plurality of display cards include a particular number of display cards selected based on a user preference of a user of the user device.

* * * * *

UNITED STATES PATENT AND TRADEMARK OFFICE
CERTIFICATE OF CORRECTION

| | | |
|---|---|---|
| PATENT NO. | : 10,353,554 B2 | Page 1 of 1 |
| APPLICATION NO. | : 14/971374 | |
| DATED | : July 16, 2019 | |
| INVENTOR(S) | : Fey et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 341 days.

Signed and Sealed this
Twenty-fifth Day of February, 2020

Andrei Iancu
*Director of the United States Patent and Trademark Office*